United States Patent
Ennis, Jr. et al.

(10) Patent No.: US 10,469,314 B2
(45) Date of Patent: *Nov. 5, 2019

(54) API GATEWAY FOR NETWORK POLICY AND CONFIGURATION MANAGEMENT WITH PUBLIC CLOUD

(71) Applicant: Infoblox Inc., Santa Clara, CA (US)

(72) Inventors: James D. Ennis, Jr., Dalton, NH (US); Mehul Jayantilal Bhatt, Bangalore (IN); John Charles Voss, Redwood City, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,915

(22) Filed: Oct. 17, 2018

(65) Prior Publication Data

US 2019/0140895 A1    May 9, 2019

Related U.S. Application Data

(63) Continuation of application No. 15/073,523, filed on Mar. 17, 2016, now Pat. No. 10,148,493.

(Continued)

(51) Int. Cl.
*H04L 12/24* (2006.01)
*H04L 29/08* (2006.01)
(Continued)

(52) U.S. Cl.
CPC ............ *H04L 41/0803* (2013.01); *G06F 9/54* (2013.01); *H04L 12/66* (2013.01);
(Continued)

(58) Field of Classification Search
CPC . H04L 41/0803; H04L 67/10; H04L 41/0893; H04L 63/10; H04L 61/2015;
(Continued)

(56) References Cited

U.S. PATENT DOCUMENTS 7,433,935 B1    10/2008 Obert
8,351,453 B2    1/2013 Park
(Continued)

OTHER PUBLICATIONS

Author Unknown, Grid and Multi-Grid Management, Infoblox Datasheet, Jul. 2013.
(Continued)

*Primary Examiner* — Michael Won
(74) *Attorney, Agent, or Firm* — Van Pelt, Yi & James LLP

(57) ABSTRACT

Techniques for providing an API gateway for network policy and configuration management with public cloud are disclosed. In some embodiments, a system, process, and/or computer program product for an API gateway for network policy and configuration management with public cloud includes receiving a native or extended public cloud application programming interface (API) request at the API gateway; processing the public cloud API request; extracting data from the request for use in other API calls; and, in some cases, translating the public cloud API request into a native public cloud API request with or without adding parameters or properties to and/or substituting new values for parameters in the public cloud API request (e.g., in some cases modifying the public cloud API request can include inserting additional parameters/properties, such as instance IP address that was not present in the initial API request); and sending the native public cloud API request to the public cloud environment.

37 Claims, 19 Drawing Sheets

Related U.S. Application Data

(60) Provisional application No. 62/172,719, filed on Jun. 8, 2015.

(51) Int. Cl.
*H04L 12/66* (2006.01)
*G06F 9/54* (2006.01)
*H04L 29/12* (2006.01)
*H04L 29/06* (2006.01)

(52) U.S. Cl.
CPC ...... *H04L 41/0893* (2013.01); *H04L 61/2015* (2013.01); *H04L 61/2076* (2013.01); *H04L 63/10* (2013.01); *H04L 67/02* (2013.01); *H04L 67/10* (2013.01); *H04L 67/34* (2013.01); *H04L 61/1511* (2013.01)

(58) Field of Classification Search
CPC ..... H04L 61/2076; H04L 67/02; H04L 67/34; H04L 12/66; H04L 61/1511; G06F 9/54
See application file for complete search history.

(56) References Cited

U.S. PATENT DOCUMENTS

| | | | |
|---|---|---|---|
| 8,402,139 B2 | 3/2013 | Ferris | |
| 8,631,099 B2 | 1/2014 | Morgan | |
| 8,805,971 B1 | 8/2014 | Roth | |
| 9,767,494 B2 | 9/2017 | Van Biljon | |
| 2002/0038340 A1 | 3/2002 | Whipple | |
| 2004/0158813 A1 | 8/2004 | Xia | |
| 2007/0239911 A1 | 10/2007 | Finnerty | |
| 2010/0318609 A1 | 12/2010 | Lahiri | |
| 2011/0010700 A1 | 1/2011 | Lanner | |
| 2011/0153868 A1 | 6/2011 | Castleberry | |
| 2012/0110055 A1 | 5/2012 | Van Biljon | |
| 2012/0124211 A1 | 5/2012 | Kampas | |
| 2012/0239739 A1 | 9/2012 | Manglik | |
| 2013/0080509 A1 | 3/2013 | Wang | |
| 2013/0191509 A1 | 7/2013 | Loughry | |
| 2014/0032691 A1 | 1/2014 | Barton | |
| 2014/0059226 A1 | 2/2014 | Messerli | |
| 2014/0108474 A1 | 4/2014 | David | |
| 2014/0180915 A1 | 6/2014 | Montulli | |
| 2014/0344340 A1 | 11/2014 | Tang | |
| 2015/0074670 A1* | 3/2015 | Gerganov | G06F 9/5027 718/103 |
| 2015/0280959 A1 | 10/2015 | Vincent | |
| 2015/0319050 A1* | 11/2015 | Kasturi | H04L 47/70 709/224 |
| 2015/0358225 A1 | 12/2015 | Zawari | |
| 2016/0087940 A1 | 3/2016 | Miller | |
| 2016/0127454 A1 | 5/2016 | Maheshwari | |
| 2016/0218926 A1 | 7/2016 | Johnson | |
| 2017/0085447 A1 | 3/2017 | Chen | |
| 2017/0134491 A1* | 5/2017 | Gupta | H04L 67/306 |
| 2018/0089132 A1 | 3/2018 | Atta | |
| 2019/0097969 A1* | 3/2019 | Voss | H04L 61/3025 |
| 2019/0140895 A1* | 5/2019 | Ennis, Jr. | H04L 41/0803 |

OTHER PUBLICATIONS

Author Unknown, Amazon Elastic Compute Cloud, API Reference, API Version Apr. 15, 2015, downloaded from docs.aws.amazon on Jun. 1, 2015.

Author Unknown, Infoblox NIOS Software Whitepaper, Aug. 1, 2010.

Buyya et al., Future Generation Computer Systems 25, pp. 599-616, 2009.

Metsch et al., Open Cloud Computing Interface—Infrastructure, Apr. 13, 2015.

Petcu et al., Towards a Cross Platform Cloud API, Components for Cloud Federation, 1st International Conference on Cloud Computing and Services Science at pp. 166-169, 2011.

Zhang et al., Cloud computing: state-of-the-art and research challenges, J Internet Serv Appl (2010) 1:7-18, Apr. 20, 2010.

* cited by examiner

Deployment Scenario 2

Deployment Scenario 4

Deployment Scenario 5

Deployment Scenario 7

API GATEWAY FOR NETWORK POLICY AND CONFIGURATION MANAGEMENT WITH PUBLIC CLOUD

CROSS REFERENCE TO OTHER APPLICATIONS

This application is a continuation of U.S. patent application Ser. No. 15/073,523, entitled API GATEWAY FOR NETWORK POLICY AND CONFIGURATION MANAGEMENT WITH PUBLIC CLOUD, filed Mar. 17, 2016, which claims priority to U.S. Provisional Patent Application No. 62/172,719, entitled API GATEWAY FOR NETWORK POLICY AND CONFIGURATION MANAGEMENT WITH PUBLIC CLOUD, filed Jun. 8, 2015, both of which are incorporated herein by reference for all purposes.

BACKGROUND OF THE INVENTION

The trend towards moving more computing resources and workloads to cloud computing environments is increasing. Cloud computing, also known as on-demand computing, generally refers to Internet-based computing, in which shared resources and information are provided to computers and other devices on-demand. Cloud computing services typically facilitate on-demand access to a shared set of computing resources, which can include computing and/or storage resources. Cloud computing solutions provide users and enterprises with various capabilities to process and store their data in third-party data centers.

BRIEF DESCRIPTION OF THE DRAWINGS

Various embodiments of the invention are disclosed in the following detailed description and the accompanying drawings.

DETAILED DESCRIPTION

Figure 1:
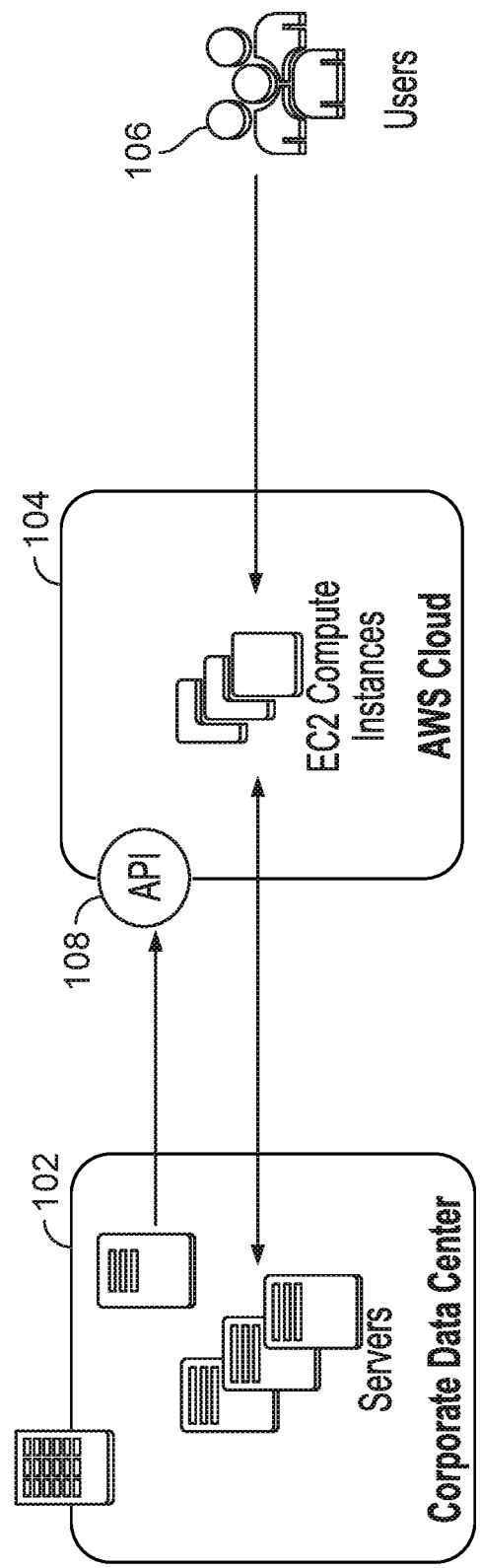
FIG. 1 illustrates a network architecture of an example public cloud service.

The invention can be implemented in numerous ways, including as a process; an apparatus; a system; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The trend towards moving more computing resources and workloads to cloud computing environments is increasing. Cloud computing, also known as on-demand computing, generally refers to Internet-based computing, in which shared resources and information are provided to computers and other devices on-demand. Cloud computing services typically facilitate on-demand access to a shared set of computing resources, which can include computing and/or storage resources. Cloud computing solutions provide users and enterprises with various capabilities to process and store their data in third-party data centers.

A cloud is generally referred to as a public cloud if the cloud services are rendered over a network that is open for public use, such as the Internet. Generally, public cloud service providers like Amazon (e.g., Amazon Web Services® (AWS)), IBM (e.g., IBM Cloud), Google (e.g., Google Cloud Platform), and Microsoft (e.g., Microsoft Azure®) provide cloud platform/services using computing and storage infrastructures at their respective data centers and access is generally available via the Internet. Amazon and Microsoft also offer direct connect services, which are called AWS Direct Connect and Azure ExpressRoute, respectively. Such connections typically require customers to purchase or lease a private connection to a peering point offered by the cloud provider.

For example, AWS is a public cloud service which is made up of many different services, including the Elastic Compute Cloud (EC2) service. EC2 generally offers its customers the ability to deploy compute workloads in a public cloud computing environment that elastically scales to meet capacity requirements. EC2 is supported by many other services for everything from elastically scalable storage to DNS with global load balancing.

Enterprises are also increasingly using virtualization to improve efficiency and to reduce costs of their computing infrastructures. Virtualization generally allows for a more dynamic computing infrastructure with a higher optimal utilization of computing resources (e.g., physical servers, networking devices such as switches and/or routers, and/or other computing resources). In addition, virtualization can also offer greater flexibility, such as in disaster recovery and dynamic movement of a virtual server from one location to another.

Virtualization generally allows for a more dynamic computing infrastructure with a higher optimal utilization of physical servers. For example, virtualization allows a single physical machine (e.g., physical server) to host a large number of virtual resources, such as hundreds of virtual resources (e.g., anywhere between less than 20 and more than 200 VMs per server). As a result, there is typically less capital expenditure on computing hardware (e.g., physical servers and/or other computing hardware) when enterprises utilize virtualization for some of their entire computing infrastructure. Virtualization also allows for a pay-as-you-go model for managing compute capacity, such as using public cloud services that provide such a dynamic computing infrastructure (e.g., Amazon, Google, IBM, and Microsoft, such as similarly discussed above). In addition, virtualization can also offer flexibility in disaster recovery and dynamic movement of a virtual server from one location to another.

With advances in cloud computing and virtualization, a system administrator (admin) is able to easily add or remove physical computing resources and/or virtual computing resources, such as a virtual machine (VM), device, or network, as needed, to dynamically match computing and networking needs. Also, because virtualization allows a single physical machine to host a large number of virtual resources, it is not uncommon for a single organization to utilize hundreds of virtual resources.

For example, an enterprise can use a cloud management platform (CMP) to implement some or all of their enterprise data center using a cloud environment (e.g., generally referred to herein as cloud network environment or cloud network) that includes physical and virtual resources on their CMP (e.g., physical and network devices on their CMP).

The management of these physical and virtual resources for enterprises using such cloud-based computing environments has been traditionally difficult. For example, the "virtual sprawl" of an organization's resources across various users, physical machines, and types of networks (e.g., private or housed/managed by other entities or other boundaries) makes information about virtual resources difficult to obtain and understand. For example, it is difficult for a network administrator to understand what resources are actually being used versus what has essentially been forgotten or abandoned. Additionally, a network administrator generally wants to ensure that all virtual machines are provisioned consistently and in compliance with policies. Therefore, there exists a need for a better way to obtain and manage information about physical and virtual resources on the CMP.

For example, a VM can be part of multiple networks depending on the access requirements of applications that execute on the VMs. As such, a number of Internet protocol (IP) addresses (IPs) could be assigned per server. As another example, VMs are also added to a Domain Name System (DNS) domain, and DNS names are assigned to VMs. Currently, Information Technology (IT) administrators (e.g., network/server administrators (admins)) typically assign these IPs and DNS names manually.

Also, enterprises may utilize one or more different public cloud service providers. Each of the public cloud service providers typically provides different interfaces (e.g., Application Programming Interfaces (APIs)) for accessing and configuring resources on their respective public clouds. It is common in the field of software technology products for customers to want one vendor's product to extend and enhance another vendor's product.

As an example, it is desirable to facilitate enhanced integration of various DNS and IPAM software technology products with public cloud service solutions. Generally, vendors encourage third-party software product integration by providing interfaces that others can use to facilitate at least some degree of integration. Third-party software that utilizes such interfaces is often referred to as a plug-in or an extension. Software that provides such interfaces is often referred to as pluggable and open. Vendor programs encouraging the adoption of these interfaces are often referred to as "software eco-systems." For example, such interfaces can notify third-party software of user requests, actions, and workflows, allow third-party software to read and/or modify related data, and start other actions.

However, some vendors, including public cloud service providers, do not provide pluggable interfaces for various reasons (e.g., security, proprietary platform, market focus, and/or other reasons). Specifically, many existing public cloud services do not provide APIs that facilitate network policy and configuration management in their public cloud environments.

A common software delivery model called Software as a Service (SaaS) provides its customers access to software applications and services via public Internet connections. A similar concept called Infrastructure as a Service (IaaS) provides customers access to compute, network and storage infrastructure on which they may deploy their own applications. Many examples of IaaS providers exist, including various public cloud service providers, such as Amazon, Google, IBM, and Microsoft, as similarly described above.

IaaS customers can typically access Graphical User Interfaces (GUIs) for human interaction or APIs for machine interaction. The well-known locations for API access are often referred to as API service endpoints. APIs typically have a message structure that defines certain operations, which may be customized with inputs and which take actions and return outputs. For example, IaaS providers, such as public cloud service providers, typically publish a set of APIs (e.g., REST APIs) and document how customers can call and utilize their APIs and perform various public cloud service related operations (e.g., creating a new instance, assigning an IP address to the new instance, and/or other public cloud service related operations) using their set of APIs (e.g., Amazon Elastic Compute Cloud (EC2) publishes an Amazon Elastic Compute Cloud API Reference Guide, which is publicly available from Amazon at http://docs.aws.amazon.com/AWSEC2/latest/APIReference).

FIG. 1 illustrates a network architecture of an example public cloud service. As an example, a typical usage of an IaaS service, such as Amazon's Elastic Cloud Computing (EC2) provided by AWS, is to host applications that execute together on multiple compute instances and communicate with each other and with the customer's own compute resources across a network. EC2 customers generally can configure and control EC2 via basic commands sent to an API service endpoint (e.g., an AWS API service endpoint).

Referring to FIG. 1, an enterprise data center, shown as corporate data center 102, includes various servers and other computing/storage devices. Enterprise data center 102 is in communication (e.g., via the Internet) with a public cloud service provider, shown as AWS cloud 104. AWS cloud 104 includes various EC2 compute instances as also shown, which can communicate with data center 102 via network communications (e.g., via the Internet, in which secure/VPN or other network communications can be performed to facilitate intercommunications between servers/other devices in data center 102 with EC2 compute instances/other VM instances and/or physical devices in AWS cloud 104). Users 106 are shown in communication with AWS cloud 104, such as via networked communications from client devices in communication with AWS cloud 104 via the Internet. As also shown, AWS cloud 104 provides an API service endpoint 108 that facilitates configuration and control (e.g., using a basic set of computing resource related configuration/control commands) of AWS cloud 104 by automation programs in corporate data center 102. As would be apparent to one of ordinary skill in the art, the network architecture shown in FIG. 1 can also similarly be applied to other IaaS providers, such as other public cloud service providers (e.g., Microsoft Azure®, IBM Cloud, and Google Cloud Platform).

However, some customers require more management and control over the network (IP) addresses and Domain Name Server (DNS) names than certain IaaS providers natively offer or expose to their customers/vendors via their respective public cloud APIs. As an example, many IaaS customers may desire to manage these together with and as an extension to their own private networks using DNS and IPAM tools, such as provided by Infoblox Inc. and/or other vendors.

As such, it is desirable to facilitate DNS and IPAM solutions (e.g., including the NIOS Grid solution provided by Infoblox, Inc.) to integrate with public cloud services (e.g., EC2 provided by AWS and/or other public cloud services). For example, such an integration can facilitate allowing customers to manage the IP/network addresses assigned (e.g., to new computing resources, such as new EC2 compute instances), allocate new IP/network addresses based on policy, and/or define network naming and associated metadata.

However, many IaaS service providers, including many public cloud service providers, such as AWS EC2, Microsoft Azure, and others, do not provide a mechanism for vendors providing DNS, Dynamic Host Configuration Protocol (DHCP), and IP Address Management (IPAM) (e.g., DNS, DHCP, and IPAM are also referred to as DDI) solutions such as Infoblox and others, to create these extensions or otherwise integrate with their public cloud service provider platforms.

Thus, there is a need for new and improved techniques for network policy and configuration management in public cloud environments.

Overview of Techniques for an API Gateway for Network Policy and Configuration Management with Public Cloud Accordingly, techniques for providing an API gateway for network policy and configuration management with public cloud (e.g., a public cloud environment) are disclosed. For example, various techniques are disclosed to extend and enhance certain types of software products/services (e.g., public cloud services) that are not pluggable or otherwise extendable (e.g., to enhance application programming interface (API) requests to include, for example, extensible attributes (EAs), to facilitate improved integration with DDI services for network policy and configuration management with the public cloud environment).

In some embodiments, a system, process, and/or computer program product for an API gateway for network policy and configuration management with public cloud includes receiving a native application programming interface (API) request at the API gateway; processing the native API request based on contents of the native API request using the API gateway; and sending the native API request (e.g., unmodified native API request) to the public cloud environment.

For example, the API gateway can intercept a native API request (e.g., run instance/create instance) and based on information in the native API request (e.g., subnet ID), correlate with metadata tags pre-configured by a user (e.g., an extensible attributes (EA) as provided in commercially available IPAM products provided by Infoblox Inc.) to determine the CIDR from which to allocate an IP address (e.g., in an Infoblox NIOS system).

In one embodiment, a system, process, and/or computer program product for an API gateway for network policy and configuration management with public cloud further includes inserting data in a modified version of the native API request based on processing using the API gateway based on contents of the native API request; and sending the modified version of the native API request to the public cloud environment.

In one embodiment, the received API request is an extended public cloud API request, and a system, process, and/or computer program product for an API gateway for network policy and configuration management with public cloud further includes processing the extended public cloud API request to translate the extended public cloud API request into a native public cloud API request; and sending the native public cloud API request to the public cloud environment.

For example, the disclosed techniques can provide an extension of corporate DNS and IPAM functionalities to workloads executing in a public cloud environment (e.g., AWS or another public cloud environment) along with automated workflows for enhanced integration of an enterprise data center with the public cloud environment. In an example implementation, the extended public cloud API request can include an extended attribute (EA) or a metadata tag (e.g., user specified metadata tag) that is not supported by the native API(s) for the public cloud environment. In some cases, the extended public cloud API request is modified to include an additional or substituted parameter in the native public cloud API request based on processing of the extended public cloud API request. As an example, the extended public cloud API request can indicate whether the resource is a newly added resource in the public cloud environment, a deleted resource in the public cloud environment, or a modified resource in the public cloud environment.

In an example implementation, the API gateway is implemented on a member of a grid, in which the grid includes a plurality of members and a grid master. For example, the cloud platform appliance can include an IP address and/or a DNS record management appliance. As another example, the cloud platform appliance can include a DHCP IP address distribution and/or a DNS record management appliance. For example, the API gateway and an API client can communicate using a secure protocol.

In one embodiment, a system, process, and/or computer program product for an API gateway for network policy and configuration management with public cloud further includes intercepting the extended public cloud API request at the API gateway, wherein the API gateway inspects, processes, and modifies the extended public cloud API request to generate the native public cloud API request. For example, modifying the extended public cloud API request to generate the native public cloud API request can include adding or substituting new parameters into the generated native public cloud API request.

In one embodiment, a system, process, and/or computer program product for an API gateway for network policy and configuration management with public cloud further includes intercepting the extended public cloud API request at the API gateway; and triggering a workflow to extend capabilities of the native public cloud API based on the intercepted extended public cloud API request.

In one embodiment, a system, process, and/or computer program product for an API gateway for network policy and configuration management with public cloud further includes authenticating, authorizing, and/or validating the extended public cloud API request.

In one embodiment, a system, process, and/or computer program product for an API gateway for network policy and configuration management with public cloud further includes communicating with a grid master or a cloud member that authoritatively administers an object associated with the extended public cloud API request.

In one embodiment, a system, process, and/or computer program product for an API gateway for network policy and configuration management with public cloud further includes extending the capabilities of a native API for a public cloud service by intercepting, inspecting, and modifying the native API calls for the public cloud service. For example, this approach can facilitate enhanced integration of DDI services with the public cloud for an enterprise data center, such as to provide for network policy and configuration management with the public cloud, such as further described below.

In one embodiment, a system, process, and/or computer program product for an API gateway for network policy and configuration management with public cloud further includes triggering an external workflow(s) to extend the capabilities of a native API for a public cloud service based on intercepted API messages, such as further described below.

In one embodiment, a system, process, and/or computer program product for an API gateway for network policy and configuration management with public cloud further includes allowing a user to provide additional inputs to those workflows using embedded parameters (e.g., embedded parameter strings included in enhanced API requests), such as further described below.

In one embodiment, a system, process, and/or computer program product for an API gateway for network policy and configuration management with public cloud further includes extending these APIs to allow provisioning of network addresses based on a network policy (e.g., a user configured network policy), such as further described below.

In one embodiment, a system, process, and/or computer program product for an API gateway for network policy and configuration management with public cloud further includes identifying inconsistencies in what is known about the public cloud environment model based on a request and triggering automatic discovery to resolve the inconsistences, such as further described below. In one embodiment, automatic discovery is performed to establish and update knowledge of the public cloud environment (e.g., when no API calls are received).

In one embodiment, a system, process, and/or computer program product for an API gateway for network policy and configuration management with public cloud further includes extracting information from the API request and updating a data store for use in other API calls. For example, on a VPC create request, the API gateway can store the VPC information and then the API call can be forwarded/sent unchanged. Similarly for a VPC Subnet create request, the API gateway can store the VPC Subnet metadata and then the API call can be forwarded/sent unchanged. In this example, for a RunInstances request, the VPC Subnet create metadata can be used for allocating IP addresses.

In some embodiments, the disclosed techniques for an API gateway for network policy and configuration management with public cloud automate IPAM and DNS record management for physical and virtual network devices on an enterprise's cloud management platform (CMP). For example, instead of manually provisioning IP addresses and DNS name spaces for network devices and interfaces, enterprises can use the disclosed techniques for an API gateway for network policy and configuration management with public cloud to leverage DNS and DHCP features of a centralized IPAM solution, such as using a grid of IPAM devices/appliances (e.g., a collection of appliances to perform and be managed as an integrated/unified system, which can include a grid master, which can be an IPAM appliance that maintains a central data store for the grid) to manage their cloud networks.

In some embodiments, provisioning an IP address and performing a DNS registration are automatically and programmatically performed for a physical and/or virtual resource (e.g., a virtual machine, a virtual entity, a virtual device, a virtual network, a virtual switch, a virtual host adaptor, a virtual appliance, or any other element of a virtual cloud). In some embodiments, an Internet Protocol address management (IPAM) appliance manages Internet Protocol (IP) addresses of one or more physical and/or virtual resources in a public cloud environment in addition to managing IP addresses for physical servers and devices. For example, by communicating with the IPAM appliance, an IP address can be automatically obtained, updated, or released for a physical and/or a virtual resource in a public cloud network. In some embodiments, DNS registration is automatically managed for one or more physical and/or virtual resources in a cloud network. For example, a DNS record is automatically updated for a physical and/or virtual resource in the public cloud network, as required.

As further described below, these and various other features and techniques are disclosed for an API gateway for network policy and configuration management with public cloud.

Figure 2:
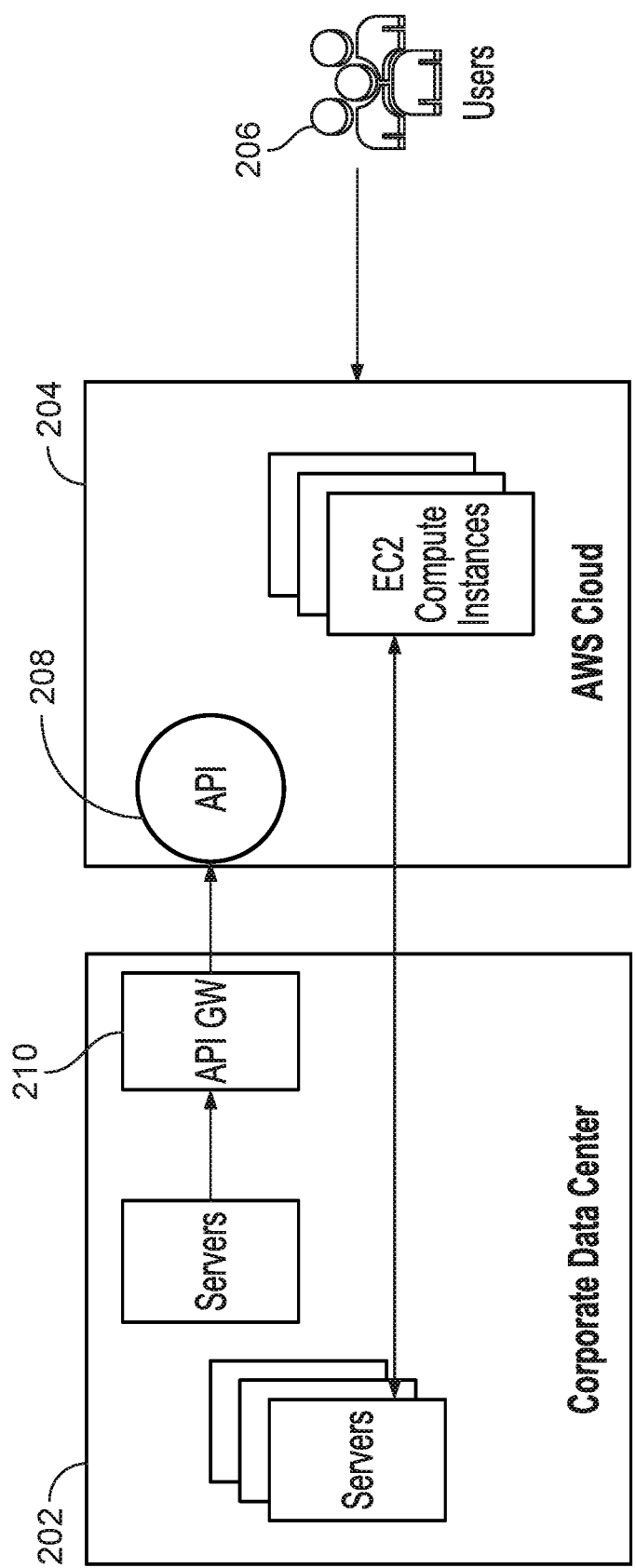
FIG. 2 is a network diagram illustrating a network architecture for providing an API gateway for network policy and configuration management with public cloud in accordance with some embodiments.

Example Network Architectures for an API Gateway for Network Policy and Configuration Management with Public Cloud FIG. 2 is a network diagram illustrating a network architecture for providing an API gateway for network policy and configuration management with public cloud in accordance with some embodiments. As similarly described above with respect to FIG. 1, a typical usage of an IaaS service, such as the public cloud service EC2 that is provided by AWS, is to host applications that execute together on multiple compute instances and communicate with each other and with the customer's own compute resources across a network. EC2 customers generally can configure and control EC2 via basic commands sent to an API service endpoint (e.g., an AWS API service endpoint).

Referring to FIG. 2, an enterprise data center, shown as corporate data center 202, includes various servers and other computing/storage devices. Enterprise data center 202 is in communication (e.g., via the Internet) with a public cloud service provider, shown as AWS cloud 204. AWS cloud 204 includes various EC2 compute instances as also shown, which can communicate with data center 202 via network communications (e.g., via the Internet, in which secure/VPN or other network communications can be performed to facilitate secure intercommunications between servers/other devices in data center 202 with EC2 compute instances/other VM instances and/or physical devices in AWS cloud 204). Users 206 are shown in communication with AWS cloud 204, such as via networked communications from client devices in communication with AWS cloud 204 via the Internet. As also shown, AWS cloud 204 provides an API service endpoint 208 (e.g., an AWS API service endpoint in this example) that facilitates command and control (e.g., using a basic set of computing resource related configuration/control commands) of AWS cloud 204 by automation programs in the corporate data center 202. As would be apparent to one of ordinary skill in the art, the network architecture shown in FIG. 2 can also similarly be applied to another IaaS provider, such as another public cloud service provider (e.g., Microsoft Azure®, IBM Cloud, Google Cloud Platform, and/or other public cloud service providers).

As also similarly described above with respect to FIG. 1, many IaaS service providers, including many public cloud service providers, such as AWS EC2, Microsoft Azure, and others, do not provide a mechanism for vendors providing DNS, Dynamic Host Configuration Protocol (DHCP), and IP Address Management (IPAM) (e.g., DNS, DHCP, and IPAM are also referred to as DDI) technical solutions, such as Infoblox and others, to create API extensions or otherwise integrate with their public cloud service provider platforms to facilitate enhanced DDI integration with their public cloud environment.

As shown in FIG. 2, an API gateway (GW) 210 is shown between data center 202 (e.g., AWS API requests can be sent from a cloud management platform (CMP) appliance in data center 202) and API service endpoint 208. In network security terms, the gateway effectively functions as a "man-in-the-middle," however, in this case, the user has sanctioned/authorized the gateway by providing their credentials (e.g., API clients can explicitly connect to the API gateway, such as by sending the API request to the API gateway IP(s) or a client application or script can make a TCP connection directly to the API gateway, or the API clients' requests can be transparently directed to the API gateway, such as by using DNS endpoint redirection, such as by changing the internal DNS server for the data center to force AWS endpoints to map to the API gateway IP(s), such as further described below).

For example, API gateway 210 can be implemented as a function used to provide interaction with the automation configuring AWS and AWS itself. As will be further described below, a user (e.g., network admin of data center 202) can direct AWS API requests to API gateway 210 instead of the AWS API service endpoint or such requests can be automatically redirected to API gateway 210. As will also be further described below, API gateway 210 can modify the requests (e.g., as necessary) before forwarding them over a separate connection to the real AWS API service endpoint. API gateway 210 can also receive request responses from the AWS API service endpoint, learn from them (e.g., as necessary), and forward them to the requester (e.g., over the original connection). In an example implementation, the disclosed functionality performed by API gateway 210 can be implemented on Cloud Platform Members (CPM) (e.g., a cloud platform appliance) and on the Grid Master (GM).

In some embodiments, API gateway 210 is an API gateway for network policy and configuration management with public cloud. For example, API gateway 210 provides a technical networking solution that can facilitate more enhanced management and control over the network (IP) addresses and Doman Name Server (DNS) names than certain IaaS providers, such as public cloud service providers that natively offer or expose to their customers/vendors through, for example, their existing defined set of APIs. As an example, many IaaS customers (e.g., enterprises with data centers that utilize public cloud environments) desire to manage these together with and as an extension to their own private networks (e.g., enterprise on-premise data centers) using DNS and IPAM (DDI) solutions/tools, such as provided by Infoblox Inc. and/or other vendors. As further described below, API gateway 210 provides a technical solution to enable such customers to manage these together with and as an extension to their own private networks using DDI solutions/tools, such as provided by Infoblox Inc. and/or other DDI vendors.

In some embodiments, API gateway 210 extends DNS and IPAM solutions (e.g., including the NIOS Grid solution provided by Infoblox, Inc.) to integrate with public cloud environments, such as EC2 provided by AWS. As will become apparent to one of ordinary skill in the art, the disclosed techniques can also similarly be applied to other IaaS providers, such as another public cloud service provider (e.g., Microsoft Azure®, IBM Cloud, Google Cloud Platform, and/or other public cloud service providers). For example, such an integration can facilitate allowing customers to manage the IP/network addresses assigned (e.g., to new computing resources, such as new EC2 compute instances), allocate new IP/network addresses based on policy, and/or define network naming and associated metadata.

In some embodiments, API gateway 210 implements a software process executed on a gateway or other physical hardware computing device (e.g., a server, gateway, appliance, and/or other computing device) that intercepts messages (e.g., API requests/responses) sent to/from the API service endpoint. For example, API gateway 210 can physically reside within corporate data center 202 or at another physical location (e.g., accessible via network/Internet communications). As another example, API gateway 210 can physically reside within AWS cloud 204 (e.g., implemented in a virtualized computing environment such as an EC2 computing instance(s)).

In an example implementation, API gateway 210 provides for the following functionality: (1) discovering how a customer's EC2 environment is configured; (2) determining what changes the customer wants to perform to the EC2 configuration; (3) initiating workflows to automate IP Address Management (IPAM) and DNS functions (e.g., DDI related functions/activities and metadata configuration and synchronization for the customer's DDI solution for their private data center and public cloud integration); and/or (4) automatically modifying intercepted messages (e.g., API requests/responses) to control AWS in enhanced ways to facilitate enhanced DDI integration. Each of these aspects provided by an API gateway for network policy and configuration management with public cloud will be further described below.

Figure 3:
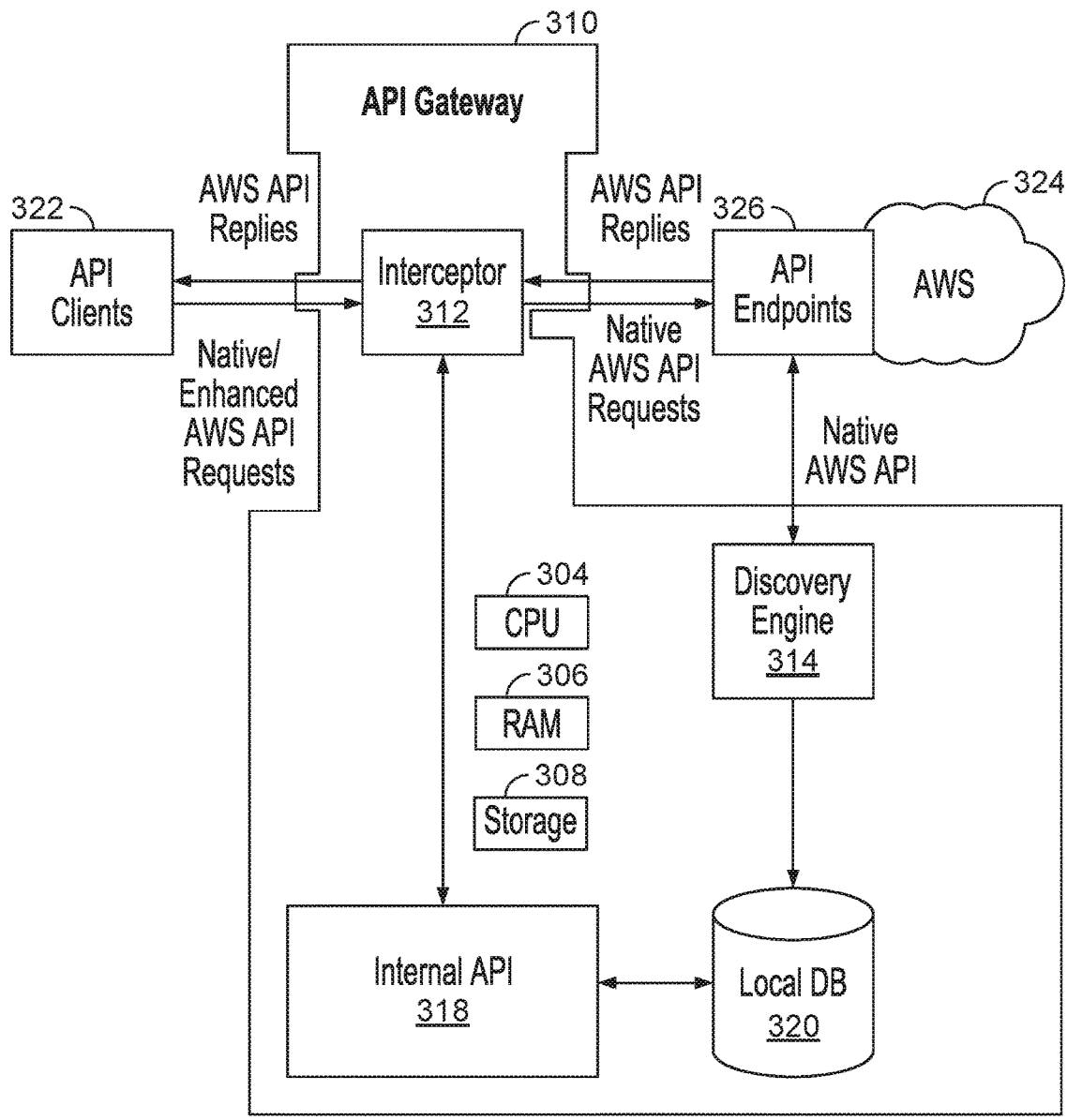
FIG. 3 is a component diagram of an API gateway illustrating an architecture for providing an API gateway for network policy and configuration management with public cloud in accordance with some embodiments.

Example Components of an API Gateway for Network Policy and Configuration Management with Public Cloud FIG. 3 is a component diagram of an API gateway illustrating an architecture for providing an API gateway for network policy and configuration management with public cloud in accordance with some embodiments. As shown, an API gateway 310 includes a CPU 304, a RAM 306, and a data storage 308, as well as various components as further described below.

Referring to FIG. 3, API gateway 310 includes an interceptor 312 for intercepting native AWS API requests and/or enhanced AWS API requests from API clients 322 (e.g., AWS API requests can be sent from a cloud management platform (CMP) appliance or another device/appliance) and for intercepting AWS API replies from API endpoints 326 of a public cloud service shown as AWS 324. For example, API clients 322 can send native AWS API requests and, in some cases, enhanced AWS API requests to API gateway 310 (e.g., by directing such AWS API requests to a URL/URI specified for/associated with the API gateway).

In an example implementation, API clients can explicitly connect to the API gateway (e.g., sending the request to the API gateway IP(s) or a client application or script can make a TCP connection directly to the API gateway), or the API clients' requests can be transparently directed to the API gateway (e.g., using DNS endpoint redirection, such as by changing the internal DNS server for the data center so that AWS endpoints are mapped to the API gateway IP(s)). For example, the API gateway can implement a dedicated port (e.g., a configurable port number selection) to have a separate HTTP(S) server process listening on a non-standard TCP port for receiving AWS API (HTTPS) requests/calls (e.g., which may be preferable for avoiding name space collisions and/or from a platform security perspective). As another example, the API gateway can implement a dedicated port to utilize an existing HTTP(S) server process listening on the dedicated port (e.g., port 443) for GUI and WAPI requests, and the API gateway can be configured to demultiplex intercepted AWS API messages (e.g., AWS API requests/responses) from other existing requests and pass the AWS API messages to the appropriate component(s) for processing, such as further described below.

Also, in this example implementation, interceptor 312 analyzes the request (e.g., AWS API request) and depending on contents of the request may trigger additional processing. The additional processing may need to effect changes or retrieve data maintained elsewhere in the system. In this example, if processing of the request determines that data maintained elsewhere in the system should be retrieved, then such data can be retrieved using internal API 318 (e.g., an internal API with proxy forwarding capabilities to handle cases where the required data is not stored/maintained on the local system, such as to access data maintained on other cloud members or a grid master). As also shown, internal API layer 318 is in communication with a local database (DB) 320 (e.g., the local DB can communicate with the grid master via grid data replication such that grid replication can be performed to facilitate synchronization of DNS and IPAM data associated with the public cloud network(s) across a grid associated with the grid master). As further described below, the internal API layer facilitates processing of the intercepted AWS API requests and AWS API replies by executing various automated IPAM and DNS workflows for specific API actions, updating AWS API requests and/or AWS API replies in some cases, such as further described below.

As also shown in FIG. 3, API gateway 310 includes a discovery engine 314 For example, discovery engine 314 can send native AWS API requests to API endpoints 326 and receive native AWS API responses from API endpoints 326 to facilitate discovery of AWS objects (e.g., including DNS and IPAM related data associated with AWS objects, such as physical/virtual devices including instances) in the public cloud network(s) maintained by AWS 324. Discovery engine 314 is in communication with local database (DB) 320 and with grid master 340 via grid replication communication (e.g., to facilitate synchronization of DNS/IPAM data associated with the public cloud network(s) across a grid associated with the grid master). As further described below, discovery engine 314 can perform various discoveries of DNS and IPAM data associated with the public cloud network(s) (e.g., on demand discovery, scheduled discovery, and/or other discovery actions/workflows can be automatically performed), as further described below.

In an example implementation, the discovery function (e.g., a public cloud discovery function) is provided by discovery engine 314. For example, the public cloud service (e.g., AWS or another public cloud service) typically provides various mechanisms that can change configuration without using the APIs (e.g., AWS Management Console, Cloudfront, Autoscaling, etc.). The disclosed discovery function allows the API gateway (e.g., NIOS platform executed on the API gateway/cloud platform appliance) to query for specific information directly from the API endpoints of the AWS public cloud service using the native AWS APIs (e.g., standard AWS APIs) so that any errors or gaps in the information obtained by the API gateway can be fixed or resolved. In this example, the AWS discovery can be implemented as an AWS plug-in module.

For example, the public cloud discovery function can receive requests via a queue. Requests to perform AWS discovery can come directly from the user (e.g., on-demand), from the public cloud discovery function's periodic scheduling interface, from the AWS API gateway function, and, in some cases, from the AWS discovery function itself. As an example, the user and periodic requests can cause the entire EC2 object space to be queried for a specific AWS access key. Requests from the API gateway and the discovery function may be limited scope requests for specific objects that the API gateway is attempting to discover/learn more information about within the AWS public cloud.

In one embodiment, objects created, modified, or deleted in AWS 324 are automatically reflected in data store 320 (e.g., and replicated across the grid via grid master 340). In an example implementation, data store 320 can be implemented using a commercially available or open source object/relational database, such as using the commercially available Infoblox NIOS™ software, which includes a built-in, InfobloxSDB™ integrated database technology as a component of the Infoblox NIOS™ software, that supports local high availability (HA) and database synchronization of all objects across a grid to ensure that the database of host names, IP addresses, A/PTR records, zones, DHCP fixed address records, DHCP leases, and/or other IPAM, DNS, and DHCP objects is continually synchronized between active/standby devices and across the grid.

In an example implementation, one or more of components 312, 314, 318, and 320 can be implemented as a software component stored in a RAM 306 and/or a storage component 308 and executed on a CPU 304. In some implementations, one or more of these functions can be performed by another device or function, such as the WAPI cloud API layer can be performed (e.g., in-whole or in-part) using another device or function (e.g., the proxy component can be a sub-component of the interceptor and/or discovery engine) and/or the local database can be provided by a data store implemented on a distinct device.

In an example implementation, a hardware configuration of the API gateway can include multiple CPU cores (e.g., two to four or more CPU cores with a virtual CPU core frequency of 2000 MHz, 6000 MHz, 12000 MHz, or greater), a memory (e.g., a memory size of 2 GB, 8 GB, 12 GB, or greater), and a storage (e.g., 160 GB or greater).

In one embodiment, API gateway 310 receives native/enhanced AWS API requests (e.g., in some cases, the AWS API requests can be enhanced AWS API requests as similarly described above, in other cases, the AWS API requests can simply be native AWS API requests) from API clients 322, and API gateway 310 executes automated IPAM and DNS workflows for specific API actions. For example, API gateway 310 can update/modify an enhanced API request (e.g., to automatically translate the enhanced AWS API request to a native AWS API request, which can include modifying the enhanced AWS API request to add/remove parameters, modify values for parameters, and/or perform other modifications) and then can forward the native AWS API request to API endpoints 326 of AWS 324. API gateway 310 can receive AWS API replies from API endpoints 326 of AWS 324 and can then complete the automated IPAM and/or DNS workflow for the enhanced AWS API request and forward the AWS API reply to API clients 322.

In one embodiment, API gateway 310 actively discovers AWS objects via native AWS API communications using discovery engine 314, such as similarly described above. For example, API gateway 310 can be configured to periodically discover AWS objects (e.g., including DNS and IPAM data associated with AWS objects, such as physical/virtual devices including instances) in the public cloud network(s) maintained by AWS 324 via native AWS API communications with API endpoints 326 of AWS 324 and/or perform AWS public cloud discovery, such as on demand, periodically, and/or to resolve discrepancies determined based on intercepted AWS API request(s)/response(s). API gateway 310 can synchronize the discovered DNS and/or IPAM data associated with the discovered AWS objects with the grid (e.g., a synchronized set of DNS and/or IPAM appliances) via grid replication communications with grid master 340.

As an example, AWS API requests are directed from API clients 322 to API gateway 310 for implementing an automated IPAM and DNS solution, such as will be further described below.

As another example, API gateway 310 provides for automated provisioning of DNS records for AWS instances maintained in AWS 324, such as will be further described below.

As yet another example, API gateway 310 actively discovers AWS objects via native AWS API requests (e.g., performed periodically, on demand, and/or to resolve discrepancies determined based on intercepted AWS API request(s)/response(s)), and the discovered AWS objects and associated DNS and/or IPAM data can then be viewed on a user interface (UI).

Referring to FIG. 3, cloud API requests from API clients (e.g., a device/interface for configuring public cloud resources) are processed through API gateway 310. In an example implementation, API gateway 310 can operate on a cloud platform appliance, a grid member, a grid master, or using another physical computing device (e.g., the API gateway can be implemented in software, such as using the C and/or Java programming language or another programming language, and executed on a physical computing device, which can be located on premise of an enterprise network, in a public cloud network, and/or another location accessible via public/private network communications). For example, the cloud API service can also be deployed/installed and executed on a grid master, such as grid master 340, as well as other cloud platform members (e.g., cloud members, which can be implemented on distinct appliances/servers), such as other cloud members 330. In an example implementation, API gateway 310 communicates using a secure protocol, such as using HTTPS-based communications (e.g., the cloud API service can communicate via port 443 for HTTPS connectivity, in which this service can use a virtual IP (VIP) address as the destination address).

In one embodiment, API gateway 310 implements the activity described above with respect to FIG. 2 (e.g., API gateway 210) and as further described below with respect to various embodiments and use case scenarios. For example, enhanced AWS API requests can be processed by API gateway 310 using CPU 304, RAM 306, and storage 308 to facilitate authenticating and processing enhanced AWS API requests received by API clients 322 to facilitate enhanced network policy and configuration management with the public cloud network(s) maintained in AWS 324, such as further described below. Also, as would be apparent to one of ordinary skill in the art, the network architecture shown in FIG. 3 can also similarly be applied to another IaaS provider, such as another public cloud service provider (e.g., Microsoft Azure®, IBM Cloud, Google Cloud Platform, and/or other public cloud service providers).

Figure 4:
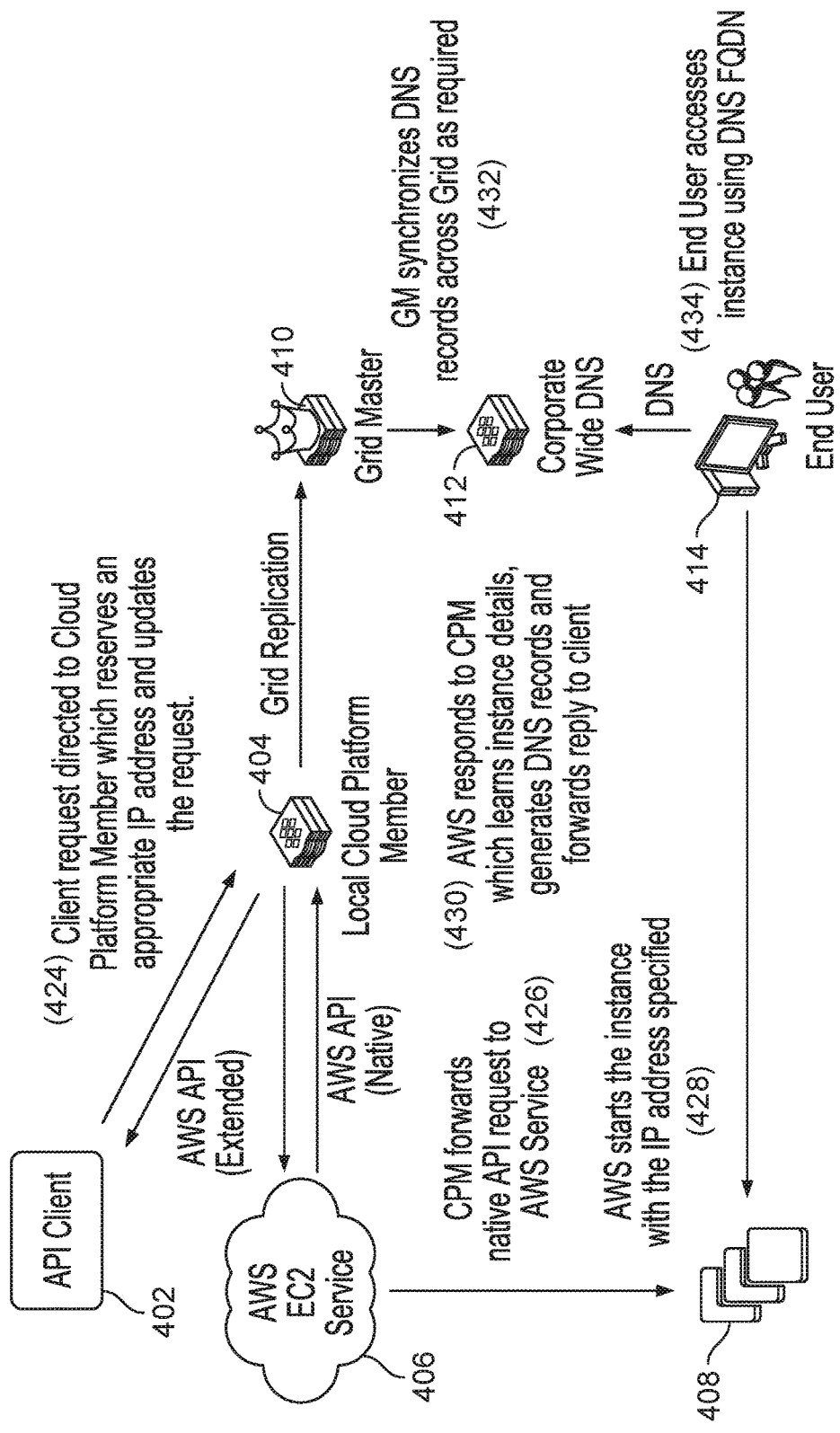
FIG. 4 is a network diagram illustrating device interactions in a network architecture for providing an API gateway for network policy and configuration management with public cloud in accordance with some embodiments.

Example for Provisioning a Public Cloud VM Instance with API Gateway Integration FIG. 4 is a network diagram illustrating device interactions in a network architecture for providing an API gateway for network policy and configuration management with public cloud in accordance with some embodiments.

Referring to FIG. 4, an API client 402 (e.g., a CMP appliance or another device/appliance) communicates with a local cloud platform member (CPM) 404 (e.g., in this example, the local CPM is configured to implement the API gateway functionality as disclosed herein) using enhanced AWS API requests (e.g., an AWS API with extensions, such as the Infoblox AWS API extensions, such as further described below). For example, as shown at 422, the API client can execute a client script or the CMP generates a request for a new instance in the public cloud (e.g., a new EC2 instance in AWS) using the AWS API with extensions (e.g., AWS API with Infoblox extensions). In this example, as shown at 424, the API client request is directed to the local cloud platform member, which processes the AWS API with extensions to reserve an appropriate IP address and update the request (e.g., processing the AWS API with extensions can include authenticating the request, validating the request, and translating the request into a native AWS API request, such as further described below).

As shown, local cloud platform member 404 forwards the native API request to AWS EC2 service 406 as shown at 426. In this example, the native API request includes a request for a new instance in the public cloud with a specified IP address. AWS EC2 service 406 then starts/instantiates the new instance with the specified IP address as shown at 428.

As also shown at 430, AWS EC2 service 406 responds to the native API request local cloud platform member 404. In this example, cloud platform member 404 receives details of the new instance, generates DNS records, and forwards a reply to API client 402. Also, cloud platform member 404 performs grid replication communications with a grid master (GM) 410. In this example, as shown at 432, grid master 410 synchronizes DNS records across the grid (e.g., as required/needed) via communications with one or more other DNS/IPAM appliances/devices shown as a corporate wide DNS 412.

As also shown in FIG. 4, an end user 414 can access DNS information maintained by corporate wide DNS 412 via DNS requests. In this example, as shown at 434, end user 414 can access the newly created AWS EC2 instance using DNS FQDN to discover the IP address associated with/assigned to the newly created AWS EC2 instance and then can access the newly created AWS EC2 instance via public network (e.g., Internet) communications to communicate with AWS EC2 instance 408 of AWS EC2 service 406 as also shown in FIG. 4.

In an example implementation, the API requests sent to the API gateway can be formatted as native AWS EC2 API "Actions" that can also include various Infoblox-specific extensions, such as further described below. Each Action can have a type, such as "AllocateAddress," and a set of parameters that control how the action is applied. In this example, Infoblox-specific parameters can support special features, such as requesting the next available IP address based on filtering of extensible attributes (EAs). Any Infoblox-specific parameters can be removed by API gateway processing and certain EC2 parameters may be added or have their values modified. As a result, the API request that is forwarded to AWS is a purely native EC2 request. The API gateway processes the AWS APIs with extensions and forwards the processed API client's requests (e.g., as native AWS API requests) and the server's replies fast enough to avoid client reporting request timeouts, which can be as short as 60 seconds in some cases.

In an example implementation, the API gateway authenticates the API request (e.g., enhanced AWS API request/message). In this example, AWS API requests are signed by the client (e.g., API client) with an AWS user's access key (e.g., the access key can be implemented using an access key ID and a secret access key). The user can pre-configure the API gateway with all of the AWS access keys that will be used to sign AWS API requests sent to the API gateway. Upon receiving an AWS API request, the API gateway can look up the access key ID key provided and use the corresponding secret access key stored in NIOS to generate a signature for the request using the appropriate AWS algorithm. If the calculated signature matches the signature in the request, processing continues and the NIOS actions required by the AWS request can be subject to the authorizations of the NIOS user holding the access key ID. If the access key is not found or the signature is not valid, an error can be returned to the client and no action is performed on NIOS.

In one embodiment, the API requests are subject to validation processing. For example, the API gateway (e.g., executing a software platform, such as Infoblox NIOS™, on a cloud platform member/appliance) performs a validation on the cloud API request based on permissions configured for the admin users and restrictions for the applicable objects.

Example Enhanced API Requests and Syntax

Below is an example of a client request to the API gateway to launch a new instance in the public cloud (e.g., AWS EC2). In this example, the enhanced AWS API request (e.g., AWS API with extensions) is specifying a set of Extensible Attributes (e.g., tags or metadata tags) that are used to select the subnet that the instance's private IP address will come from, as provided below.

--- https://ec2.amazonaws.com/?Action=RunInstances
&SubnetId=#X-Infoblox-EA-Department=Engineering#X-IB-EA-Location=Santa Clara#X-Infoblox-EA-VLANID=200
&MaxCount=1
&MinCount=1
&KeyName=my-key-pair
&AUTHPARAMS

---

In this example, the API gateway (e.g., NIOS executed on the API gateway) validates the message (e.g., the enhanced AWS API request) and based on the action and parameters, the API gateway sends internal API calls to reserve the IP address. To re-create the API request that will be sent to AWS, the subnet parameter is no longer needed as the user had only included values for Infoblox in this example. The PrivateIpAddress parameter is inserted with the reserved IP address. An example of the resulting request from the API gateway to AWS EC2 is provided below.

```
https://ec2.amazonaws.com/?Action=RunInstances
    &SubnetId=subnet-b2a249da
    &PrivateIpAddress=10.0.0.12
    &MaxCount=1
    &MinCount=1
    &KeyName=my-key-pair
    &AUTHPARAMS
```

An example response (e.g., AWS response) to this message is provided below.

```
<RunInstancesResponse xmlns="http://ec2.amazonaws.com/doc/2014-10-1/">
  <requestId>fdcdcab1-ae5c-489e-9c33-4637c5dda355</requestId>
  <reservationSet>
    <item>
      <reservationId>r-1a2b3c4d</reservationId>
      <ownerId>123456789012</ownerId>
    </groupSet>
    <instancesSet>
      <item>
        <instanceId>i-1a2b3c4d</instanceId>
        <imageId>ami-1a2b3c4d</imageId>
        <instanceState>
          <code>16</code>
          <name>running</name>
        </instanceState>
        <privateDnsName/>
        <dnsName/>
        <reason/>
        <keyName>my-key-pair</keyName>
        <amiLaunchIndex>0</amiLaunchIndex>
        <productCodes/>
        <instanceType>c1.medium</instanceType>
        <launchTime>YYYY-MM-DDTHH:MM:SS+0000</launchTime>
        <placement>
          <availabilityZone>us-west-2a</availabilityZone>
          <groupName/>
          <tenancy>default</tenancy>
        </placement>
        <platform>windows</platform>
        <monitoring>
          <state>disabled</state>
        </monitoring>
        <subnetId>subnet-1a2b3c4d</subnetId>
        <vpcId>vpc-1a2b3c4d</vpcId>
        <privateIpAddress>10.0.0.12</privateIpAddress>
        <ipAddress>46.51.219.63</ipAddress>
        <sourceDestCheck>true</sourceDestCheck>
        <architecture>x86_64</architecture>
        <rootDeviceType>ebs</rootDeviceType>
        <rootDeviceName>/dev/sda1</rootDeviceName>
        <blockDeviceMapping>
          <item>
            <deviceName>/dev/sda1</deviceName>
            <ebs>
              <volumeId>vol-1a2b3c4d</volumeId>
              <status>attached</status>
              <attachTime>YYYY-MM-DDTHH:MM:SS.SSSZ</attachTime>
              <deleteOnTermination>true</deleteOnTermination>
            </ebs>
          </item>
        </blockDeviceMapping>
        <virtualizationType>hvm</virtualizationType>
        <clientToken>ABCDE1234567890123</clientToken>
        <tagSet>
          <item>
            <key>Name</key>
            <value>Windows Instance</value>
          </item>
        </tagSet>
        <hypervisor>xen</hypervisor>
        <networkInterfaceSet>
          <item>
            <networkInterfaceId>eni-1a2b3c4d</networkInterfaceId>
            <subnetId>subnet-1a2b3c4d</subnetId>
            <vpcId>vpc-1a2b3c4d</vpcId>
            <description>Primary network interface</description>
            <ownerId>123456789012</ownerId>
            <status>in-use</status>
            <macAddress>1b:2b:3c:4d:5e:6f</macAddress>
            <privateIpAddress>10.0.0.12</privateIpAddress>
            <sourceDestCheck>true</sourceDestCheck>
            <groupSet>
              <item>
                <groupId>sg-1a2b3c4d</groupId>
                <groupName>my-security-group</groupName>
              </item>
            </groupSet>
            <attachment>
              <attachmentId>eni-attach-1a2b3c4d</attachmentId>
              <deviceIndex>0</deviceIndex>
              <status>attached</status>
              <attachTime>YYYY-MM-DDTHH:MM:SS+0000</attachTime>
              <deleteOnTermination>true</deleteOnTermination>
            </attachment>
          </item>
        </networkInterfaceSet>
      </item>
    </instancesSet>
  </item>
  </reservationSet>
</RunInstancesResponse>
```

In an example implementation, enhanced AWS API requests can include Extensible Attributes (EAs) (e.g., Infoblox EAs and/or other EAs, such as EAs for other vendors, etc.). For example, such additional EAs can be embedded in the enhanced AWS API request seamlessly. This specific information can be added in the request by enhancing a value of a native AWS parameter. All such requests can have a predetermined prefix (e.g., #X-IB-prefix or another prefix), so that it can be easily identified and removed by the API gateway before forwarding them to the AWS service endpoint.

While processing AWS actions, users can use Extensible Attributes (EAs) for different purposes. EAs can be used to assign attribute values to objects created in the result of processing actions. For example, some workflows, including CreateVPC, CreateSubnet, RunInstances, and/or other example workflows can enable users to set EA values for the object when it is created in NIOS through the workflow. As similarly described above, the EAs can be specified in the request with a predetermined prefix (e.g., X-IB-Set-EA-prefix or another prefix). An example syntax is provided below.

X-IB-Set-EA-{name}={value}

As another example, EAs can be used to specify search criteria for IPAM objects, (e.g., hosts, networks, or fixed addresses, typically for reserving a next available resource). These attributes are referred to as searchable extensible attributes, and are specified in a request with a predetermined prefix (e.g., X-IB-{search-criteria}-EA- or another prefix). An example syntax is provided below.

X-IB-EA-{EQ|EC|NE|RE|LE|GE}-{name}={value}

Two letter search criteria means the following:
  EQ: Equal
  EX: Equal Case Sensitive (Exact)
  NE: Not Equal
  RE: Regular Expression
  LE: Less than or Equal
  GE: Greater than or Equal The above-mentioned request can be enhanced as shown in the below example.

```
https://ec2.amazonaws.com/?Action=RunInstances
        &ImageId=ami-60a54009#X-IB-EA-EX-
Department=Engineering#X-IB-EA-EX-Location=California#X-IB-GE-
EA-LE-VLANID=200
        &MaxCount=3
        &MinCount=1
        &KeyName=my-key-pair
        &Placement.AvailabilityZone=us-east-1d
        &AUTHPARAMS
```

Other Special Parameter Enhancements

In one embodiment, in addition to setting and searching EAs, various other special parameter enhancements can be provided and implemented using the API gateway and disclosed techniques. Examples of such special parameter enhancements (e.g., using embedded parameter strings in enhanced AWS API requests) can include special parameters for network views, tenants (e.g., a special NIOS object), host records (e.g., an EC2 API caller can specify the FQDN for each IP address (either to be allocated by NIOS or explicitly provided by client), and a host record can be created on NIOS using the FQDN), DNS A/CNAME/PTR records, and/or DNS views.

Intercepted Actions/Messages and Workflows

In one embodiment, the API gateway is configured to intercept various actions/messages (e.g., AWS API requests) and perform various workflows. An example of such an intercepted action can include AllocateAddress (e.g., acquires an elastic IP address from AWS), AssignPrivateIPAddresses (e.g., assigns one or more secondary private IP addresses to the given network interface), AssociateAddress (e.g., associates an elastic IP address to an instance or network interface), AttachNetworkInterface (e.g., attaches a created network interface to a (previously created) instance), CreateNetworkInterface (e.g., creates a (floating) network interface in a given subnet (EC2 terminology)/Network (NIOS terminology)), CreateSubnet (e.g., creates a subnet in an existing VPC, such as shown in the example API call described below with respect to FIG. 5), CreateTags (e.g., creates one or more user defined tags (key-value pairs) for the given resource), CreateVPC (e.g., creates a VPC), DeleteNetworkInterface (e.g., deletes a specified network interface), DeleteSubnet (e.g., deletes the specified subnet), DeleteVPC (e.g., deletes the specified VPC), DetachNetworkInterface (e.g., detaches the network interface from an instance), DisassociateAddress (e.g., disassociates an elastic IP address from the instance or network interface it is associated with), ReleaseAddress (e.g., releases an elastic IP address), ReportInstanceStatus (e.g., this API can be intercepted in order to facilitate storing the status of the instance in the API Gateway (in NIOS)), RunInstances (e.g., launches one or more instances (VMs) in EC2), StartInstances and StopInstances (e.g., these APIs can be intercepted in order to facilitate storing the status of the instance in the API Gateway (in NIOS)), TerminateInstances (e.g., to make available/free in NIOS the IP addresses associated with the terminated instances upon receiving a successful response from AWS), and/or UnassignPrivateIPAddresses (e.g., unassigns one or more private IP addresses from a network interface).

Sample API Call Using an API Gateway

Figure 5:
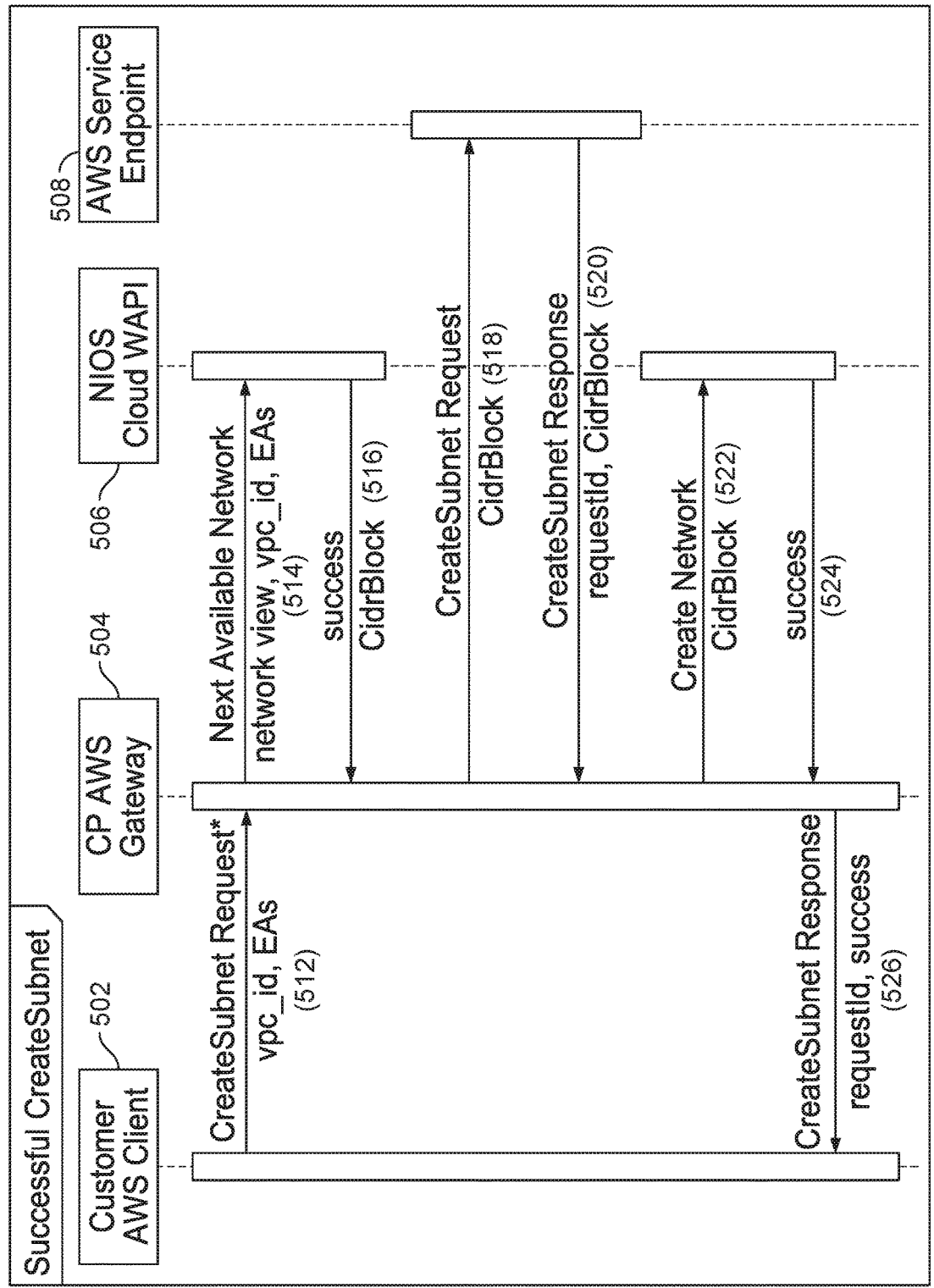
FIG. 5 is a sequence diagram illustrating a sample API call using an API gateway for network policy and configuration management with public cloud in accordance with some embodiments.

FIG. 5 is a sequence diagram illustrating a sample API call using an API gateway for network policy and configuration management with public cloud in accordance with some embodiments. For example, the sequence diagram for an enhanced/extended AWS API for requesting creation of a new subnet in the AWS cloud service as shown in FIG. 5 illustrates an example of using the disclosed API gateway for performing policy-based provisioning using enhanced APIs (e.g., AWS APIs with extensions) to configure/manage a public cloud service.

Referring to FIG. 5, a sample API call using an API gateway for creating a new subnet (e.g., a successful CreateSubnet Request) in an AWS cloud service is shown. Specifically, the sequence diagram illustrates API communications (e.g., for creating a new subnet using enhanced/extended API communications) with an AWS client (e.g., an API client of a customer of the AWS cloud service, such as a cloud management platform appliance or another device/appliance) 502, a cloud platform (CP) AWS gateway (e.g., an API gateway, which can be implemented on a cloud platform member, grid master, or another device/appliance) 504, a NIOS cloud WAPI (e.g., a WAPI cloud API layer of the API gateway, such as similarly described above with respect to FIG. 3) 506, and an AWS service endpoint (e.g., API endpoints of the AWS cloud service) 508.

At 512, AWS client 502 sends a CreateSubnet Request (e.g., including parameters vpc_id, EAs in this example CreateSubnet Request, which represents an example of an enhanced/extended AWS API request) to CP AWS gateway 504. At 514, CP AWS gateway 504 sends a request for a Next Available Network to NIOS (e.g., including parameters network view, vpc_id, EAs) cloud WAPI 506, which sends a success response (e.g., including parameters CidrBlock that specifies the next available network) at 516.

At 518, CP AWS gateway 504 sends a CreateSubnet Request (e.g., including parameters CidrBlock) to AWS service endpoint 508, which responds with a CreateSubnet Response (e.g., including parameters requestId, CidrBlock) at 520. At 522, CP AWS gateway 504 sends a Create Network API request (e.g., including parameters CidrBlock) to NIOS cloud WAPI 506, which sends a success response at 524. At 526, CP AWS gateway 504 sends a CreateSubnet Response (e.g., including parameters requestId, success) to AWS client 502.

The above-described example sequence diagram for an enhanced/extended AWS API for requesting creation of a new subnet in the AWS cloud service as shown in FIG. 5 illustrates an example of using the disclosed API gateway for performing policy-based provisioning using extended APIs to configure/manage a public cloud service, such as AWS or other public cloud services. Policy-based provisioning using the disclosed API gateway will now be further described below.

Policy-Based Provisioning

Traditional provisioning techniques typically specify configurations imperatively (e.g., "The address is X.X.X.X"). However, this generally requires that a skilled user (e.g., a skilled network administrator (admin)) systematically apply rules and conventions (e.g., policy) to manually determine the configuration.

Cloud provisioning models generally favor providing self-service capabilities to ordinary users. For example, such skilled users may not be available to apply policy to configurations.

For example, cloud provisioning generally allows for configurations that can be specified declaratively (e.g., "The address selected must have the following attributes: x, y, and z"). This declarative configuration approach allows automation to apply policy.

In one embodiment, the disclosed API gateway facilitates the above-described declarative configuration approach to allow automation to apply policy. For example, network operators can describe policy by pre-assigning descriptive attribute tags to configuration object containers in a data store (e.g., a management database or another data store). Application developers can specify the desired object attributes using extensions to the native API calls (e.g., example extensions to native APIs are described above and will be further described below). The disclosed system/process then can apply policy by selecting objects from containers matching the desired attributes, such as discussed above with respect to FIG. 5 and as will be further described below.

Example Use Cases for API Gateway for Network Policy and Configuration Management with Public Cloud Environments As similarly discussed above, existing approaches to public cloud services fail to facilitate AWS integration that allows for greater control of DNS domains in these public cloud environments, such as AWS and other public cloud environments. As also discussed above, there is a lack of automated IPAM and DNS capabilities in these public cloud services, such as AWS and other public cloud environments. As also discussed above, there is a lack of consistent DDI management capabilities across hybrid cloud deployments.

For example, existing approaches to public cloud services fail to provide an API(s) that sufficiently supports configuration policy and network management. For example, network teams have limited control in AWS Virtual Private Cloud (VPC) (e.g., and this problem exists in other public cloud services, as similarly discussed above). As an example, network/IP addresses for AWS VPC are assigned automatically when a new instance is requested and created and/or when a new subnet is requested and created. As another example, limited control over DNS domains is provided in AWS (e.g., AWS generally assigns the DNS names). As yet another example, there is a lack of automated IPAM and DNS capabilities in AWS.

Thus, there is a need for technical solutions for enhanced integration for DNS and IP addresses in these public cloud services, such as AWS and other public cloud environments.

Accordingly, the disclosed techniques for an API gateway for network policy and configuration management with public cloud services solve these and other technical problems for network policy and configuration management with public cloud services. For example, the disclosed techniques for an API gateway for network policy and configuration management with public cloud services can provide for enhanced control (e.g., greater control and, in some cases, full control) of domains in AWS via an authoritative DNS server located in Region/VPC, such as will be further described below. As another example, the disclosed techniques for an API gateway for network policy and configuration management with public cloud services can provide for automated IP address assignment and DNS records of EC2 instances, such as will be further described below. As yet another example, the disclosed techniques for an API gateway for network policy and configuration management with public cloud services can provide for a consistent (e.g., uniform) DDI experience in hybrid cloud deployments (e.g., various hybrid public cloud deployments), such as will be further described below.

Figure 6:
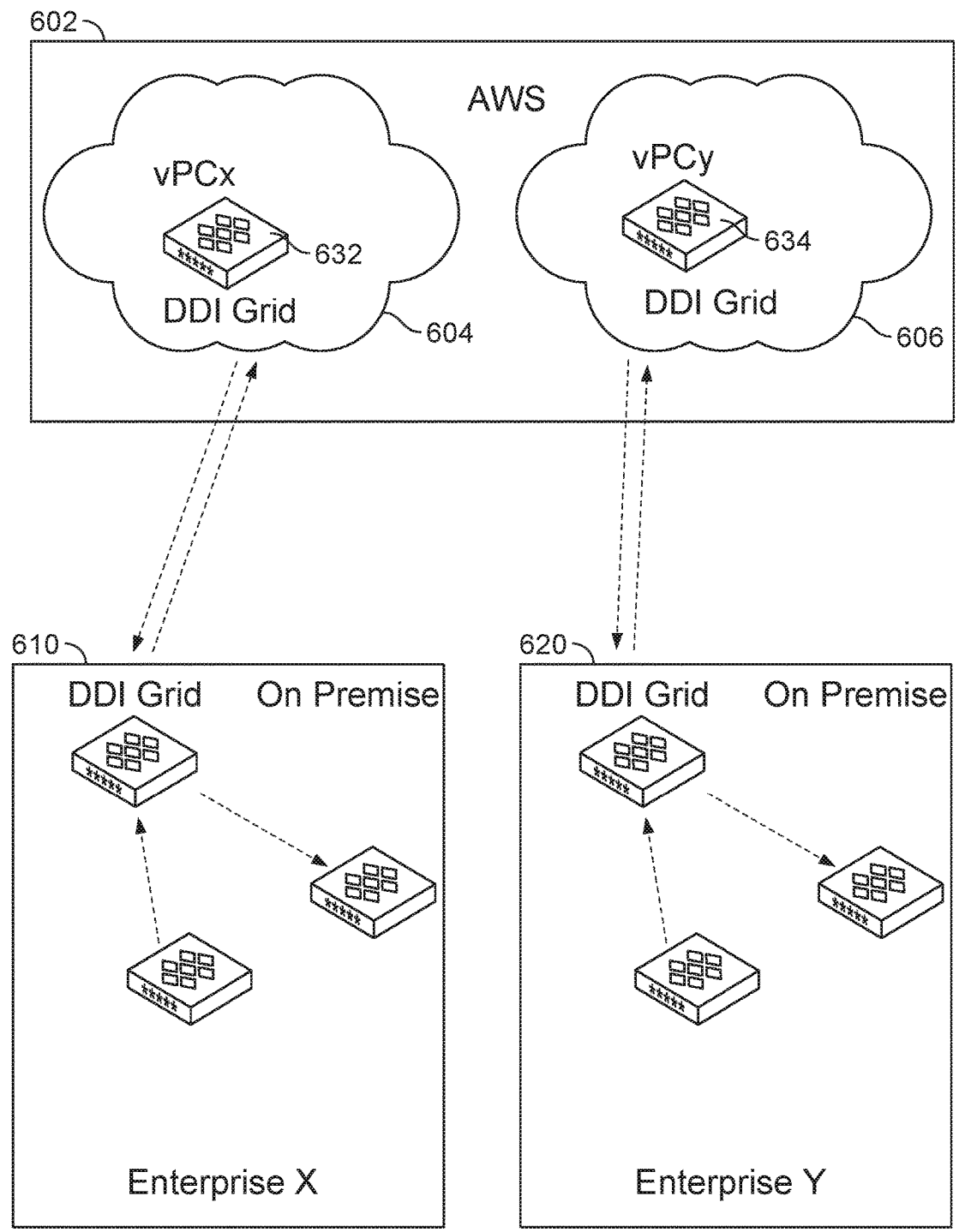
FIG. 6 is a network diagram illustrating a network architecture for providing a hybrid cloud deployment integration using an API gateway for network policy and configuration management with public cloud in accordance with some embodiments.

FIG. 6 is a network diagram illustrating a network architecture for providing a hybrid cloud deployment integration using an API gateway for network policy and configuration management with public cloud in accordance with some embodiments. For example, an API gateway can facilitate a hybrid cloud deployment integration of an enterprise DNS/IPAM network policy and configuration management with public cloud services, such as AWS or other public cloud services, such as shown in FIG. 6 and as further described below.

Referring to FIG. 6, hybrid cloud deployments are shown for enterprises X and Y. As shown, an enterprise X 610 (e.g., an on premise enterprise network) is in communication with a virtual public cloud network (vPCx) 604 (e.g., a virtual enterprise network, which includes a DDI Grid member 632) of a public cloud service AWS 602. Similarly, an enterprise Y 620 (e.g., an on premises enterprise network) is in communication with a virtual public cloud network (vPCy) 606 (e.g., a virtual enterprise network, which includes a DDI Grid member 634) of a public cloud service AWS 602. In this example, each of the enterprise networks 610 and 620 includes a DDI grid (e.g., a DDI grid can include Infoblox DDI related appliances/devices) in their on premise networks, which are in communication with respective DDI grids in the virtual networks 604 and 606 as shown.

As similarly discussed above, the disclosed techniques provide an API gateway that addresses these technical problems with existing solutions for integrating with the public cloud. For example, the disclosed techniques can facilitate the following: (1) greater and/or full control of DNS domains in the public cloud, AWS, in this example (e.g., EC2 in AWS); (2) authoritative DNS server in the VPC; (3) automated IP address assignment; (4) EC2 instances can be automatically assigned custom IP addresses; (5) automated DNS record assignments; (6) EC2 instances can be automatically assigned custom host records upon spin-up (e.g., upon being instantiated in EC2); (7) a uniform DNS, DHCP, and IP address management (DDI) experience in a hybrid cloud deployment; (8) control networks/IP address assignments; and/or (9) control DNS records/zones.

In this example deployment, DDI Grid member 632 and/or DDI Grid member 634 are each an Infoblox Grid member AMI (e.g., Amazon Machine Image), which is an Infoblox Grid image that is commercially available on the AWS Marketplace to execute in AWS. In this example, these are each an example of hybrid DDI grid deployments, which are each a DDI grid distributed across a private (e.g., on-premise) network and a public cloud environment/network (e.g., AWS).

For example, the disclosed techniques can provide for automated IP address assignments in such hybrid public cloud deployments, which allows for seamless integration with native AWS APIs using the disclosed techniques. As another example, the disclosed techniques can provide for a single pane of glass for AWS (e.g., a user interface (UI) that can include a graphical user interface (GUI) for displaying DDI related data maintained by the DDI grid using the disclosed techniques), which allows for central visibility to all DNS records, networks, and IP addresses for resources in the private (e.g., on-premise) network and the public cloud environment/network (e.g., AWS).

Example Hybrid Cloud Deployments

Figure 7:
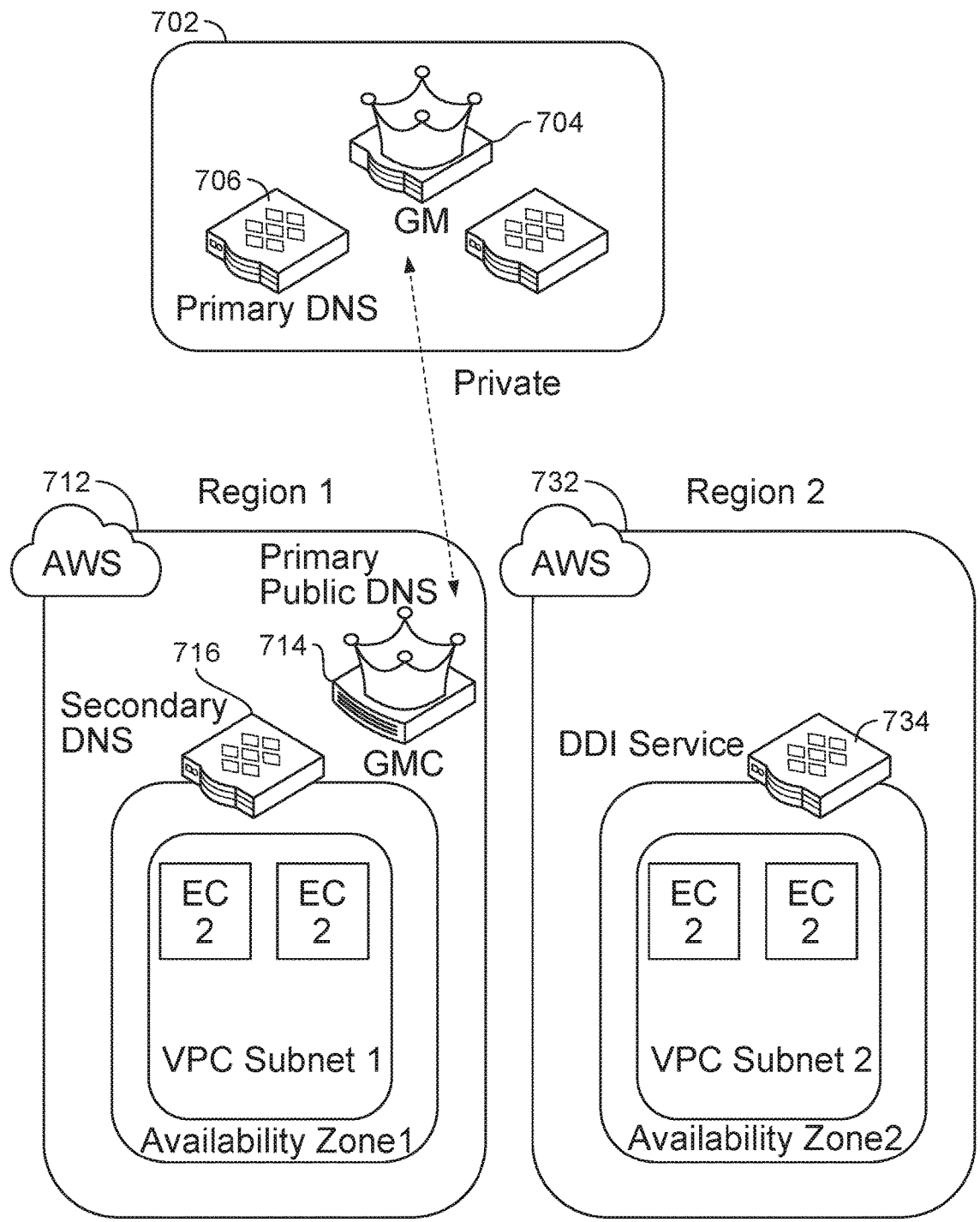
FIG. 7 is a network diagram illustrating a network architecture for providing an example deployment of a DNS server in a public cloud in accordance with some embodiments.

FIG. 7 is a network diagram illustrating a network architecture for providing an example deployment of a DNS server in a public cloud in accordance with some embodiments. For example, an API gateway can facilitate a hybrid cloud deployment integration of an enterprise DNS/IPAM network policy and configuration management with public cloud services, such as AWS or other public cloud services, such as shown in FIG. 7 and as further described below.

Referring to FIG. 7, an example deployment of a DNS server in a public cloud is shown for an enterprise network, which shows another example hybrid cloud deployment. As shown, a private enterprise network 702 (e.g., an on premise enterprise network) includes a Grid Master (GM) 704 and a primary DNS member 706. GM 704 is in communication with a Grid Master Candidate (GMC) 714 in a region 1 of a virtual public cloud (VPC) network (Region 1) 712 (e.g., a virtual enterprise network, which also includes a secondary DNS member 716) of a public cloud service AWS. Similarly, a region 2 of a virtual public cloud network (Region 2) 732 (e.g., a virtual enterprise network, which includes a DDI Service member 734) of the public cloud service AWS is also provided. In this example, each of the regions of the virtual public cloud networks, shown as Region 1 712 and Region 2 732, includes EC2 instances in their respective VPC subnets (e.g., VPC subnet 1 and VPC subnet 2, respectively) in their availability zones (e.g., availability zone 1 and availability zone 2, respectively) as shown.

In this example deployment, an Infoblox grid deployed across regions 712 and 732 can each include an Infoblox grid member AMI, which is an Infoblox grid member image that is commercially available on the AWS Marketplace to execute in AWS as described above. In this example, these are each an example of hybrid grid deployments, in which an Infoblox grid is distributed across private (e.g., on-premise) and public cloud networks (e.g., AWS).

As also shown in this example deployment, primary DNS 706 is deployed on-premise, and secondary DNS 716 is deployed in the public cloud, which is AWS in this example. In another example, the secondary DNS can be deployed on-premise, and the primary DNS can be deployed in the public cloud, which is AWS in this example.

In this example deployment, the DNS server (e.g., secondary DNS 716 and/or DDI service 734) can provide DNS services for EC2 instances in AWS. For example, placing the grid member in AWS can provide for enhanced fault tolerance.

As will now be apparent, many deployment options are possible. For example, an entire DDI grid can be deployed in the public cloud environment. As another example, only a single grid member can be deployed in the public cloud environment. As yet another example, the GM can be deployed on premise, and the GMC can be deployed in the public cloud environment, such as shown in FIG. 7. Another example hybrid cloud deployment will now be described with respect to FIG. 8.

Figure 8:
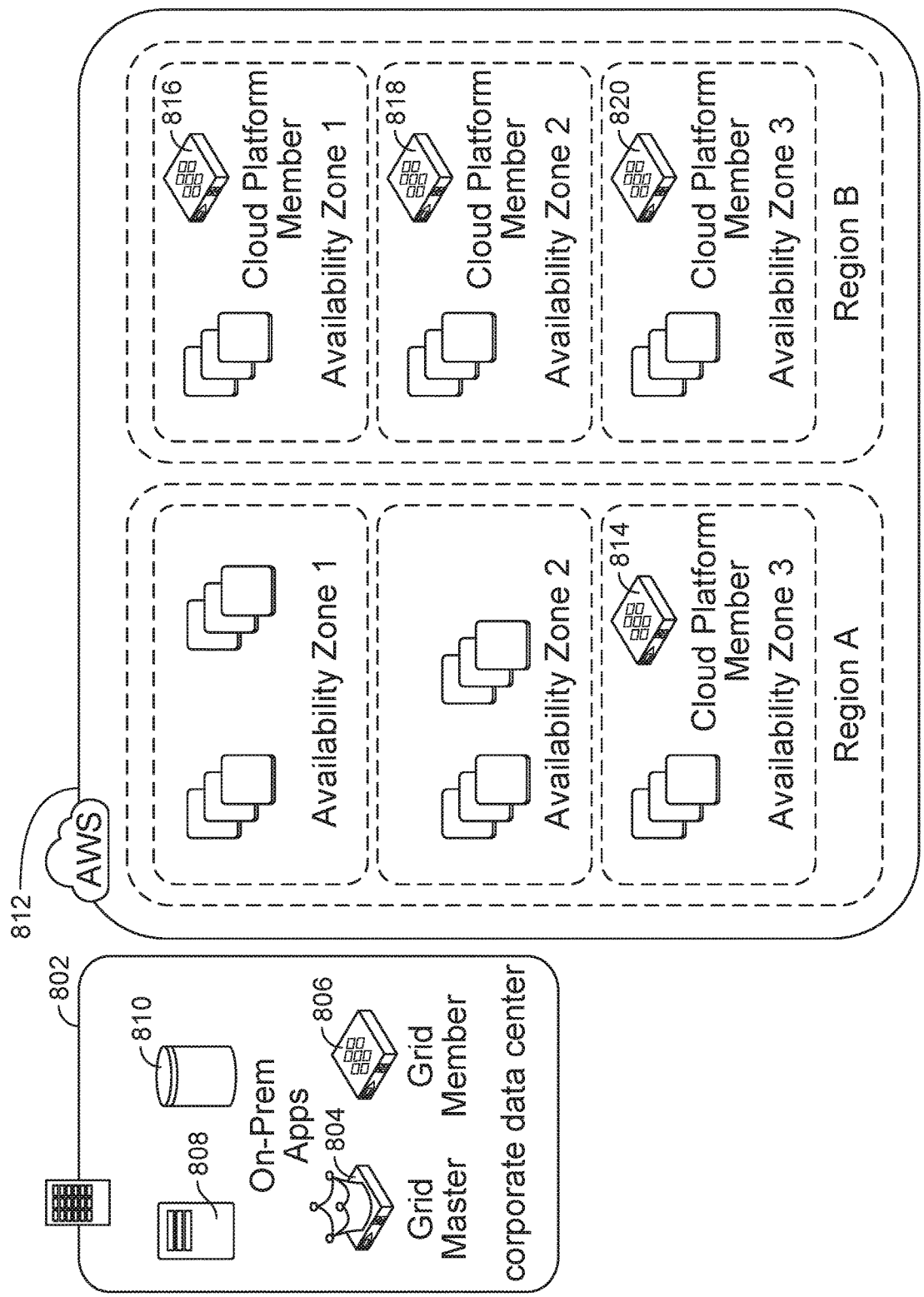
FIG. 8 is a network diagram illustrating a network architecture for providing an example public cloud deployment in accordance with some embodiments.

FIG. 8 is a network diagram illustrating a network architecture for providing an example public cloud deployment in accordance with some embodiments. For example, an API gateway can facilitate an AWS deployment integration of an enterprise DNS/IPAM network policy and configuration management with public cloud services, such as AWS or other public cloud services, such as shown in FIG. 8 and as further described below.

Referring to FIG. 8, an example AWS deployment is shown for an enterprise network, which shows another example hybrid cloud deployment. As shown, a private enterprise network 802 (e.g., an on premise enterprise network) includes a Grid Master 804, a Grid Member 806, on-premise apps 808, and data storage 810. As also shown, AWS 812 includes a Region A that includes Availability Zones 1-3 (e.g., in which Availability Zone 3 includes a Cloud Platform Member 814) and a Region B that includes Availability Zones 1-3 (e.g., each of which include Cloud Platform Members 816, 818, 820, respectively).

In this example deployment, the disclosed techniques can create consistent hybrid cloud DDI management across the on premise corporate data center 802 and the public cloud in AWS 812. For example, the disclosed techniques can automate and control DNS, network, and IP address assignments for EC2 instances in AWS. As another example, the disclosed techniques can create a fault tolerant DNS solution for the hybrid cloud deployment. As yet another example, the disclosed techniques can provide a cloud centric DDI view for AWS workloads.

In one embodiment, an API gateway is provided for facilitating integration with the public cloud deployment, such as the example deployment described above with respect to FIG. 8. An example workflow for using the API gateway for facilitating integration with the public cloud deployment will now be described. The API gateway intercepts an extended AWS API call (e.g., via an interceptor 312, such as shown in FIG. 3). The API gateway searches an NIOS database (e.g., via a WAPI cloud API layer 318, such as shown in FIG. 3) using the Extensible Attribute (EA) VPC subnet ID for the Infoblox network that matches the EA. The next available IP for the network matching the VPC subnet ID EA is determined and returned to the API gateway. The API gateway then generates and sends a rewritten native AWS API call with the specified IP address (e.g., received from the NIOS in the PrivateIpAddress parameter).

Another example workflow for using the API gateway for facilitating integration with the public cloud deployment will now be described. In this example workflow, an extension to the AWS API with Infoblox EA/value pairs or the specific Infoblox CIDR is provided. The workflow in this use case scenario is as follows. The API gateway intercepts an extended AWS API call (e.g., via an interceptor 312, such as shown in FIG. 3). The API gateway parses out the Infoblox EAs. The API gateway determines the network(s) that match the EAs or if an actual CIDR is specified, use that CIDR, and the VPC subnet ID EA value on those network(s) is returned from NIOS. The next available IP on the first matched network is obtained (e.g., if that fails, attempt to obtain the next available IP address, and so on). The API gateway then generates and sends a native AWS API call with the subnet ID and the specified IP (e.g., obtained from the NIOS IPAM database) inserted in the native AWS API.

Additional Example Deployment Scenarios

The disclosed techniques for an API gateway for network policy and configuration management with public cloud can be applied to various use case/deployment scenarios, including the additional example deployment scenarios that will now be described.

As used herein, AWS refers to Amazon Web Services. AWS generally is a collection of remote computing services that together make up a cloud computing platform, offered over the Internet by Amazon.

As used herein, a region generally is a separate geographic area. Each region can have multiple, isolated compute facilities known as Availability Zones (AZs). For example, Amazon EC2 provides users the ability to place resources, such as virtual machine (VM) instances, and data in multiple compute facilities.

As used herein, a Virtual Private Cloud (VPC), such as an Amazon Virtual Private Cloud (Amazon VPC), generally enables users to launch Amazon Web Services resources (AWS resources) into a virtual network that has been defined. For example, this virtual network can closely resemble a traditional network that can be operated in an enterprise/corporate data center, with the benefits of using the scalable infrastructure of AWS.

As used herein, Availability Zones (AZs) generally are isolated from each other (e.g., they have low latency connections). For example, AWS allows users to deploy applications across multiple availability zones for preventing unexpected outages. As such, if there is an outage with a particular availability zone, the application stays online.

As used herein, Amazon Elastic Compute Cloud (EC2) generally refers to a central part of Amazon's cloud computing platform, Amazon Web Services (AWS). For example, EC2 allows users to rent virtual computers on which to execute their own computer applications.

As used herein, an Amazon Machine Image (AMI) generally refers to a special type of virtual appliance that is used to instantiate (e.g., create/launch) a virtual machine (VM) within the EC2. AMI generally serves as the basic unit of deployment for services delivered using EC2.

As used herein, Elastic Load Balancing (ELB) generally refers to Amazon's load balancing solution that automatically scales its request-handling capacity in response to incoming application traffic. For example, ELB solutions often provide scalable cloud computing capacity.

As used herein, Identity and Access Management (IAM) generally refers to Amazon's security discipline that enables authorized individuals to access the right resources at the right times for the right reasons.

As used herein, Route 53 generally provides scalable and highly available Domain Name System (DNS). The name (Route 53) is a reference to TCP or UDP port 53, where DNS server requests are addressed.

Various example use case scenarios will now be described.

Hybrid DDI Model

For enterprises that desire a single solution for DNS, DHCP, and IP address management (DDI) in both their private and public could environments (e.g., AWS or another public cloud environment), deployment scenarios for the hybrid DDI model are described herein. In these example hybrid cloud deployments, enterprises can have workloads distributed between their private cloud and public cloud environments for a hybrid cloud (e.g., such as for providing data redundancy (DR), high availability (HA), reducing data center/infrastructure costs, etc.). A grid for DDI services can be deployed in a similar fashion, such as by having grid members distributed between private and public cloud environments and being managed from a single touch point that is generally referred to herein as a grid master that can provide an example hybrid grid deployment capability.

For example, the hybrid grid deployment capability can provide for the following: (1) reduced costs from owning and operating a single product; (2) uniform experience of managing in both environments and reduced requirements for staffing and training; (3) consolidated management view of interworking and overlapping DDI infrastructure and resources; and (4) an easier path to achieving workload mobility. The disclosed techniques can facilitate each of these potential capabilities/requirements, including the following example capabilities/requirements.

As an example, the hybrid cloud can allow enterprises to execute their infrastructure/services both on-premises (e.g., private cloud) as well as on public clouds (e.g., AWS/Amazon cloud or other public cloud services). Therefore, their DDI services generally can span across both their private cloud and public cloud environments so they can have seamless integration of DNS, DHCP, and IPAM (DDI) capabilities, such as described herein.

Also, some enterprises desire uninterrupted DDI services for their public cloud even when a connection(s) between the on-premise management (e.g., Grid Master (GM)) and off-premise services (e.g., grid members) residing in the public cloud is down (e.g., lost or not available). This is generally referred to as local survivability. The GM can be located on-premise (on-prem) or off-premise (off-prem) based on a configuration/network architecture preference of the enterprise.

In addition, upon re-establishment of connectivity, some enterprises desire automatic data synchronization from the off-prem service (e.g., grid member) to the on-prem central DDI service (e.g., GM).

As another example, some enterprises desire DDI automation such that public cloud instances (e.g., VMs) can spin-up and automatically obtain an IP address and registered DNS, alias names from an external IPAM/DNS service.

As yet another example, some enterprises desire that reporting be supported for the enterprise's infrastructure running on the public cloud environment, such as to be able to access historic associations between instances, IP addresses, and DNS records (e.g., for compliance and auditing purposes).

DDI in the Public Cloud (e.g., AWS/Amazon Cloud)

Some enterprises execute their entire IT operation in a public cloud environment (e.g., AWS or another public cloud environment) and, thus, desire a full-featured DNS, DHCP, and IP address management (DDI) solution in their public cloud environments, such as AWS. The currently available solutions typically lack the desired enterprise DDI features. As described herein, the disclosed techniques provide for a DDI solution that can execute entirely within a public cloud environment (e.g., AWS or another public cloud environment), which is able to serve workloads in separate regions, VPCs, and availability zones (e.g., and reporting can also be provided as described herein, which can be implemented inside of or outside of AWS).

DNS in the Public Cloud (e.g., AWS/Amazon Cloud)

Some enterprises desire to execute their DNS servers in a public cloud environment (e.g., AWS or another public cloud environment). Some of these enterprises prefer not to use services like AWS Route 53 because of one or more of the following reasons: Route 53 needs root zone access; Route 53 cannot function as a secondary DNS server; and Route 53 does not provide simple and easy ways to manage DNS naming for A/AAAA and CNAME records.

Also, some enterprises desire to use their own DNS service running in a public cloud environment (e.g., AWS or another public cloud environment) that will provide them greater control. However, existing solutions (e.g., Microsoft DNS and/or other existing DNS service solutions) are typically not easily manageable and do not have the ease of use such as centralized management of a distributed grid and the functions that are provided by the disclosed techniques.

Discovery of DDI Configuration/Objects in the Public Cloud (e.g., AWS/Amazon Cloud)

Another example use case is to discover the current DDI configuration in a public cloud environment (e.g., AWS or another public cloud environment). An example reason for performing such public cloud discovery for DDI configuration information is so that enterprises can have centralized visibility (e.g., a single pane of glass visibility) into all their on-prem and off-prem DDI configurations/objects. For example, when an external DDI service (e.g., Infoblox or another DDI service) connects into AWS, there is a discovery capability to read the current zones, networks, network ranges, IP address information, tags, and/or other configuration/objects into the external DDI service (e.g., a discovery component, such as discovery engine 314 of the API gateway as shown in FIG. 3). These discovered objects can then be converted into managed objects if desired by the enterprise using the disclosed techniques.

Discovery of Public Cloud Networks

Another example use case is to discover an entire network running inside a public cloud environment (e.g., AWS or another public cloud environment) for DDI related insight into the AWS instances such as tags, metadata, and/or other information. For example, this can help enterprises have better visibility into AWS objects. For example, when an external DDI service (e.g., Infoblox or another DDI service) connects into AWS, there is a discovery capability to discover the networks, VMs, vSwitches, and other network resources in AWS and understand the topology of AWS networks (e.g., a discovery component, such as discovery engine 314 of the API gateway as shown in FIG. 3).

DDI Change Workflow Management

Another example use case is to provide a capability to enterprises to change management features that allow users to create records that are not approved. DNS admins generally should approve records. For instance, one way of accomplishing this is for users to create/delete records and marking them as disabled. Admins review changes and provide users a key to activate these changes. This solution enables users to schedule DNS record creation for instances in a public cloud environment (e.g., AWS or another public cloud environment). As also described herein, enhanced web API integration using the API gateway can allow users to programmatically perform/execute the DNS record scheduling (e.g., in the grid today and in the public cloud, such as AWS).

Cloud Bursting

As another example use case, various enterprises (e.g., retail enterprises, universities, and financial institutions) employing VPC on a public cloud environment (e.g., AWS or another public cloud environment) are also interested in the cloud bursting use case to automatically scale during momentary peak loads that they experience at certain times. In this cloud bursting use case, the enterprise may spin up new virtual instances (e.g., VMs) on the VPC to meet high/peak demands. The compute demand can be predictive, in which the amount of compute required for peak demand is likely known in advance (e.g., user responses to financial market events might trigger a predicted demand for additional compute power). In this scenario, users can pre-provision grid members on the VPC to manage additional DDI capacity requirements for the new VMs spinning up. These new virtual instances can be spinning up in new Availability Zones (AZs), VPC, Regions requiring new grid members to be spun up to manage DNS, DHCP, and IPAM (DDI) for new networks, network ranges, and IP addresses and DNS records required by new EC2 instances. New grid members can also be spun up to manage these new instances spinning up translating to additional objects, which cannot be handled with existing grid members such that new grid members can be automatically spun up.

DNS Service in Public Cloud for Data Redundancy

As another example use case, the DDI (e.g., Infoblox DDI or another DDI solution) can be deployed on a public cloud environment (e.g., AWS or another public cloud environment) as an AMI for managing DNS records for on-prem endpoints. In this example use case scenario, the enterprise is not necessarily executing any workloads on AWS to be managed by the internal DNS server. The DNS server is deployed in AWS simply for DR purposes. As such, in this scenario, the DDI deployed in AWS can provide the same capabilities and functionalities as a comparable DDI deployed on-premises (e.g., and can also provide a reporting capability).

An example use case is an enterprise deploying a DNS grid member in a VPC for private DNS and making that grid member DNS authoritative for that VPC, such as further described below.

IPAM for Workloads in Public Cloud

As another example use case, the DDI (e.g., Infoblox DDI or another DDI solution) can be deployed in a public cloud environment (e.g., AWS or another public cloud environment) for IPAM of EC2 workloads running in a VPC. In this use case scenario, the enterprise is executing EC2 workloads in the VPC in AWS and desires that the DDI be authoritative for a network/network range for the VPC or AZ. For example, an orchestrator can be provided for assigning IP addresses to EC2 instances (e.g., otherwise, a user would generally have to manually assign IP addresses from the AWS console if they would like to assign specific private IP addresses from CIDR). A reporting capability for the DDI can also be provided as similarly described herein.

In this example scenario, a GM or cloud platform (CP) member can be configured as the AWS API gateway (e.g., user can have an option on a GM or CP member to enable/disable the AWS API gateway service). When AWS proxy is enabled, all of the API calls/requests can be intercepted by the grid so that such API calls/requests can be rewritten and sent to AWS using various techniques, such as similarly described herein. For instance, when a user makes an API call to AWS to create a VPC with a desired CIDR (network), the grid (e.g., using the disclosed API gateway functionality) can intercept the API call and record the values in the grid database. Thereafter, any API calls made to AWS to spin up a new EC2 instance in the VPC can be intercepted by the proxy (grid) (e.g., API gateway), such that the API call can be rewritten/translated with the next available IP address from the grid database (e.g., and signed with the AWS user API key for authorization/verification) and sent to AWS.

In an example implementation, an admin (e.g., DDI service/NIOS admin) can add a set of AWS user accounts (e.g., AWS API key(s)) based on an enterprise/user preference. These AWS user credentials can then be used on the grid for validating the AWS API calls that are coming from a valid AWS user to NIOS. After validation, when the API call is re-written with the values from the grid database, it can then be signed with the AWS API key, which can be stored in the grid database and sent to AWS for EC2 creation in a VPC.

In some cases, users can also create EAs on the grid to control the IP address allocated to the EC2 instance spinning up in a VPC in AWS, such as similarly described herein.

Discovery of EC2 Instances

As another example use case, the DDI (e.g., Infoblox DDI or another DDI solution) can be deployed either on-premises (on-prem) or in a public cloud environment (e.g., AWS or another public cloud environment) to perform automated discovery (e.g., vDiscovery) of EC2 instances in the public cloud. A reporting capability for the DDI can also be provided as similarly described herein.

Additional example deployment scenarios will now be described.

Deployment Scenario 1

Figure 9:
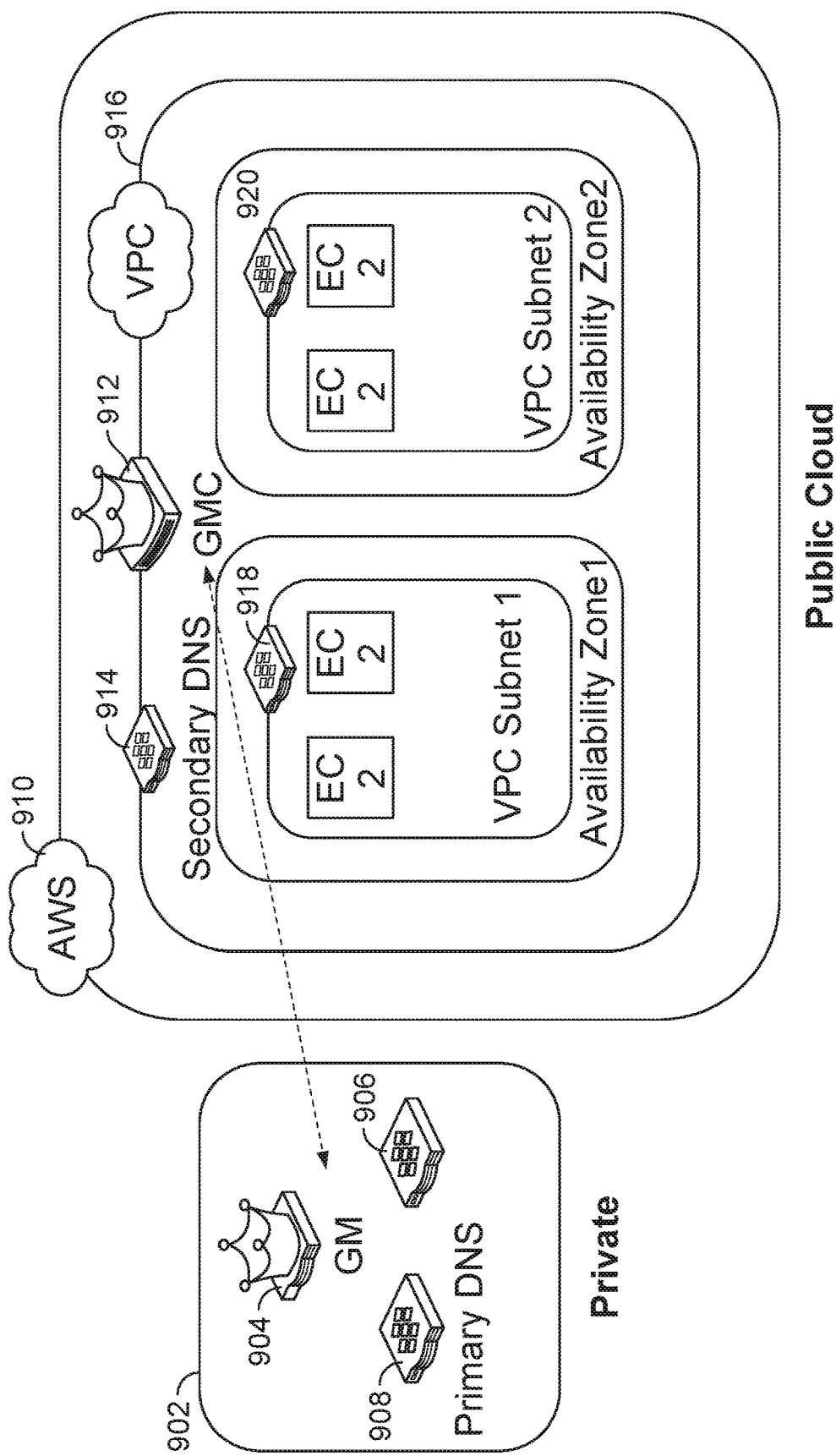
FIG. 9 is a network diagram illustrating an example deployment scenario for integration with a public cloud service using an API gateway for network policy and configuration management with public cloud in accordance with some embodiments.

FIG. 9 is a network diagram illustrating an example deployment scenario for integration with a public cloud service using an API gateway for network policy and configuration management with public cloud in accordance with some embodiments. Specifically, a first example deployment scenario for integration with a public cloud service is shown in FIG. 9.

Referring to FIG. 9, a private network 902 (e.g., an on-premise enterprise network) includes a Grid Master (GM) 904, one or more grid members 906, and a primary DNS server 908 (e.g., a DNS server/appliance). For example, grid members 906 are provided for managing on-premise servers in private network 902. Also, primary DNS server 908 can be one of the grid members in private network 902.

As also shown in FIG. 9, a public cloud network 910 (e.g., an AWS public cloud network) includes a Grid Master Candidate (GMC) 912 that is in communication with GM 904 as shown. Public cloud network 910 also includes grid members, 914, 918, and 920, as further described below. As an example, a grid member can be provided per Availability Zone (AZ) for providing locally survivable IPAM automation services for EC2 instances (e.g., grid member, shown at 918, can be provided AZ 1 and another grid member, shown at 920, can be provided for AZ 2). As also shown in FIG. 9, a secondary DNS server 914 (e.g., which is a grid member) is provided for all Availability Zones in VPC 916.

In this example deployment scenario, the grid member per zone is authoritative for the entire zone (e.g., AZ 1 or AZ 2) for providing DDI services. The grid members per VPC for multiple zones are authoritative for the entire VPC (e.g., VPC 916) for providing DNS services (e.g., for EC2 instances).

While it may be a common deployment scenario to keep the Grid Master in the customer's data center, there may be situations where it is advantageous to deploy a Grid Master or Grid Master Candidate in AWS, such as shown in FIG. 9 and other example deployment scenarios as further described below.

Deployment Scenario 2

Figure 10:
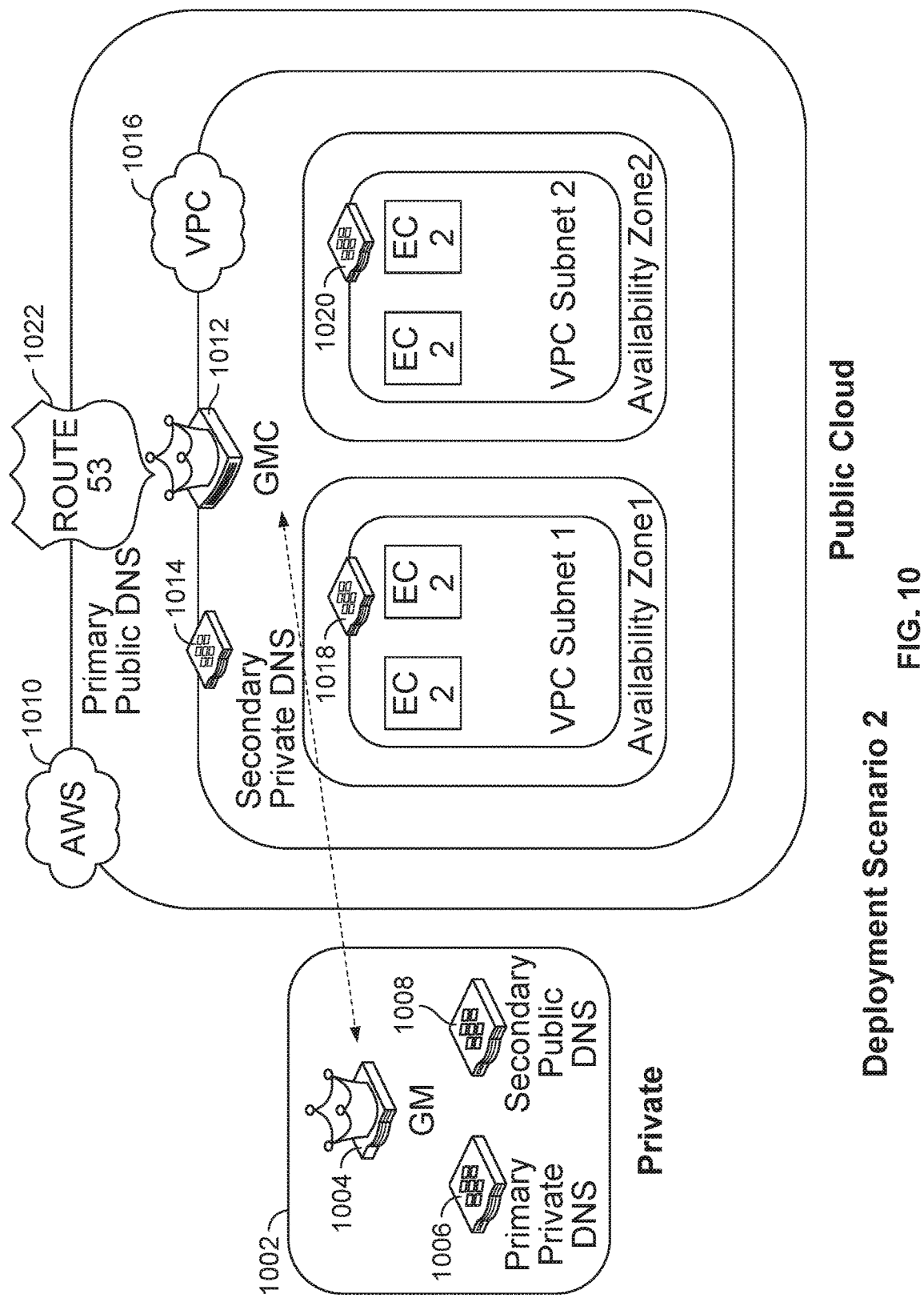
FIG. 10 is a network diagram illustrating another example deployment scenario for integration with a public cloud service using an API gateway for network policy and configuration management with public cloud in accordance with some embodiments.

FIG. 10 is a network diagram illustrating another example deployment scenario for integration with a public cloud service using an API gateway for network policy and configuration management with public cloud in accordance with some embodiments. Specifically, a second example deployment scenario for integration with a public cloud service is shown in FIG. 10.

Referring to FIG. 10, a private network 1002 (e.g., an on-premise enterprise network) includes a Grid Master (GM) 1004, a primary private DNS server 1006 (e.g., a DNS server/appliance), and a secondary public DNS server 1008 (e.g., a DNS server/appliance). For example, grid members (e.g., DNS servers 1006 and 1008) can be provided for managing on-premise servers in private network 1002.

As also shown in FIG. 10, a public cloud network 1010 (e.g., an on AWS public cloud network) includes a Grid Master Candidate (GMC) 1012 that is in communication with GM 1004 as shown (e.g., all grid members in these example deployment scenarios are in contact with the Grid Master (GM), and the dashed lines in the diagrams illustrating these example deployment scenarios are used to simply a failover relationship between the GM and the GMC). Public cloud network 1010 also includes grid members, 1014, 1018, and 1020, as further described below. As an example, a grid member can be provided per Availability Zone (AZ) for providing locally survivable IPAM automation services for EC2 instances (e.g., grid member, shown at 1018, can be provided for AZ 1 and another grid member, shown at 1020, can be provided for AZ 2).

In this example deployment scenario, the primary public DNS service is AWS Route 53 as shown at 1022. In addition, a secondary private DNS server 1014 (e.g., which is a grid member) is provided for all Availability Zones in VPC 1016.

Deployment Scenario 3

Figure 11:
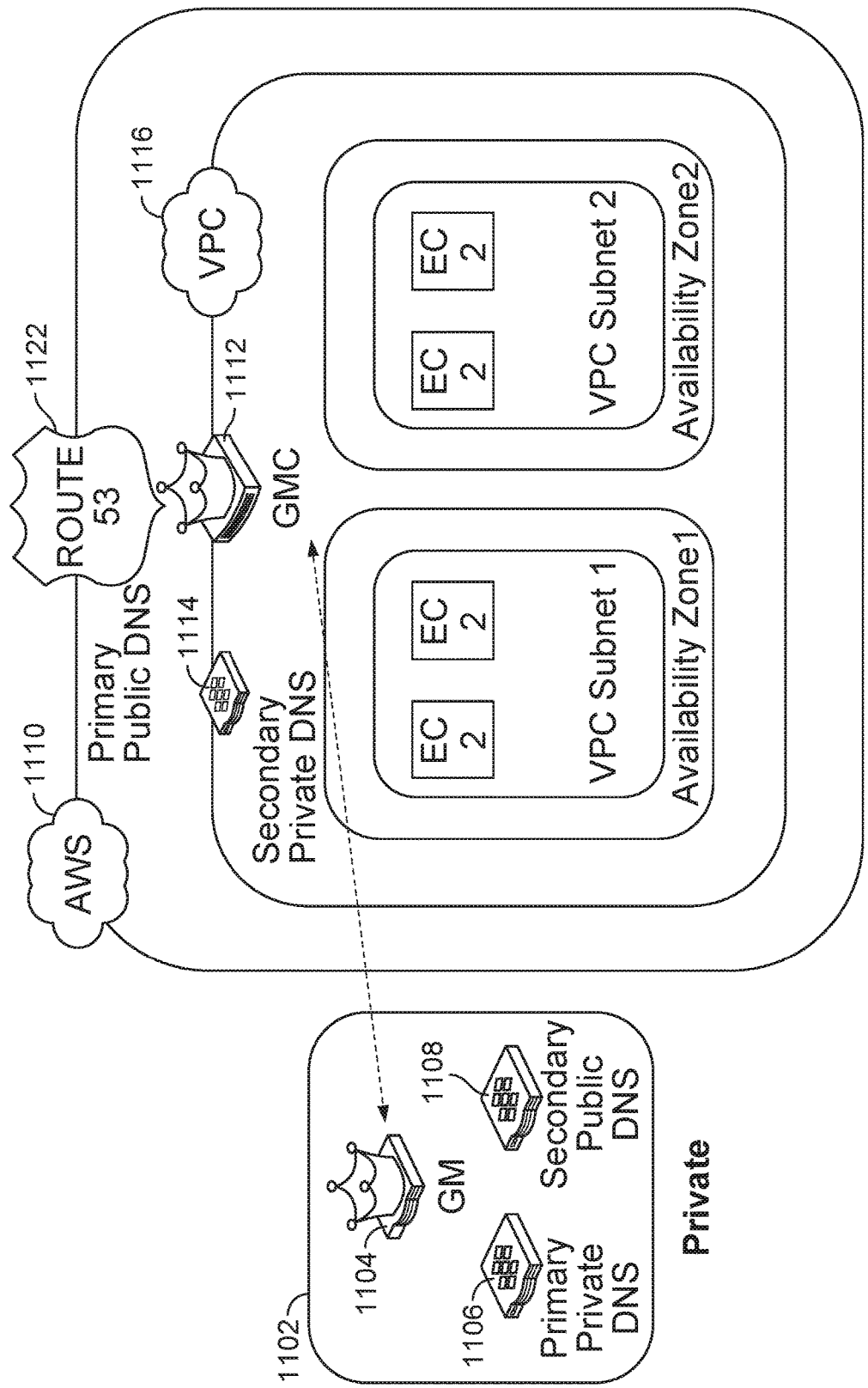
FIG. 11 is a network diagram illustrating another example deployment scenario for integration with a public cloud service using an API gateway for network policy and configuration management with public cloud in accordance with some embodiments.

FIG. 11 is a network diagram illustrating another example deployment scenario for integration with a public cloud service using an API gateway for network policy and configuration management with public cloud in accordance with some embodiments. Specifically, a third example deployment scenario for integration with a public cloud service is shown in FIG. 11.

Referring to FIG. 11, a private network 1102 (e.g., an on-premise enterprise network) includes a Grid Master (GM) 1104, a primary private DNS server 1106 (e.g., a DNS server/appliance), and a secondary public DNS server 1108 (e.g., a DNS server/appliance). For example, grid members (e.g., DNS servers 1106 and 1108) can be provided for managing on-premise servers in private network 1102.

As also shown in FIG. 11, a public cloud network 1110 (e.g., an on AWS public cloud network) includes a Grid Master Candidate (GMC) 1112 that is in communication with GM 1104 as shown. Public cloud network 1110 also includes a grid member 1114, as further described below.

In this example deployment scenario, the primary public DNS service is Route 53 as shown at 1122. Only a secondary private DNS server 1114 (e.g., which is the only grid member in VPC 1116 of public cloud 1110) is provided for all Availability Zones in VPC 1116.

Deployment Scenario 4

Figure 12:
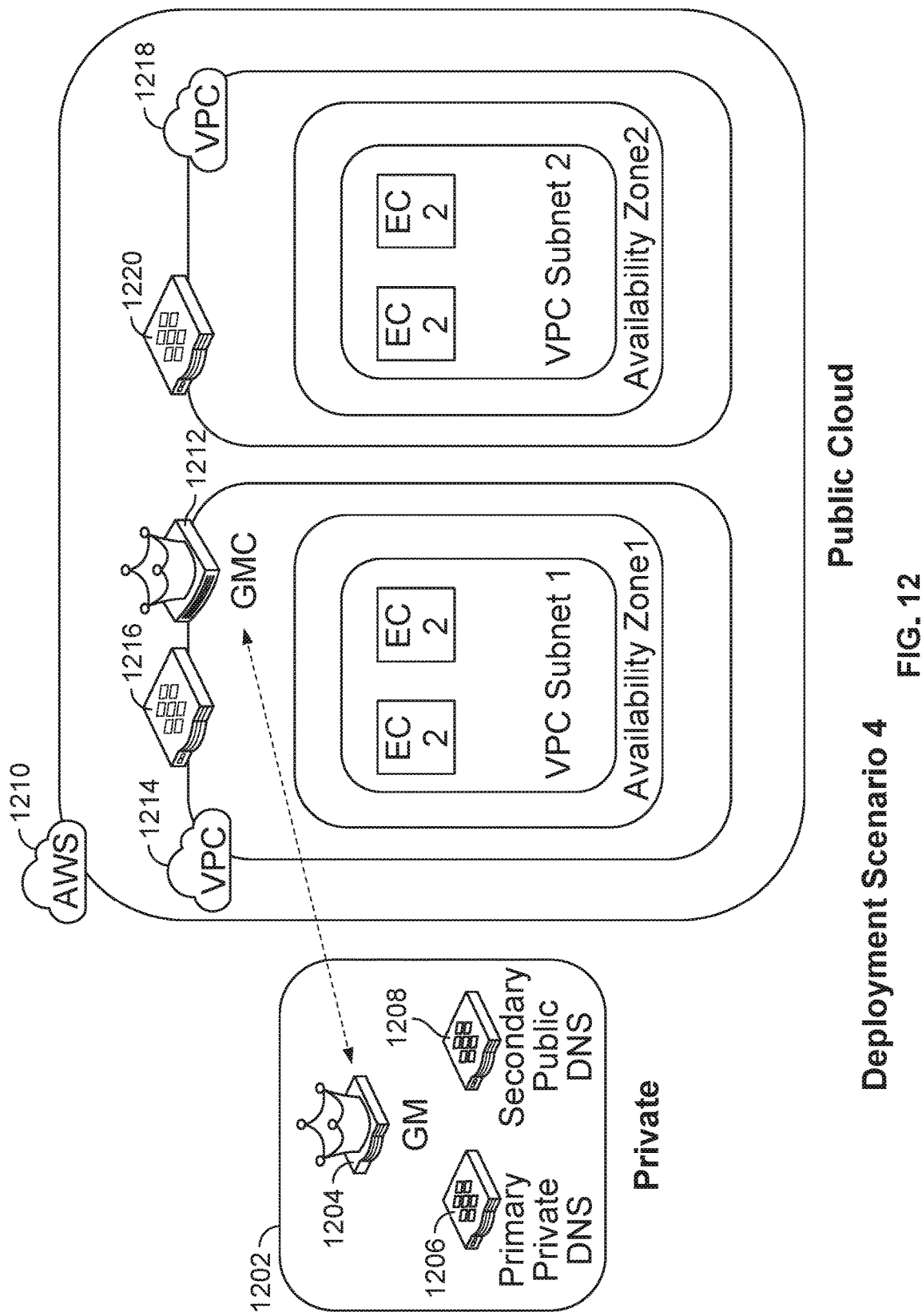
FIG. 12 is a network diagram illustrating another example deployment scenario for integration with a public cloud service using an API gateway for network policy and configuration management with public cloud in accordance with some embodiments.

FIG. 12 is a network diagram illustrating another example deployment scenario for integration with a public cloud service using an API gateway for network policy and configuration management with public cloud in accordance with some embodiments. Specifically, a fourth example deployment scenario for integration with a public cloud service is shown in FIG. 12.

Referring to FIG. 12, a private network 1202 (e.g., an on-premise enterprise network) includes a Grid Master (GM) 1204, a primary private DNS server 1206 (e.g., a DNS server/appliance), and a secondary public DNS server 1208 (e.g., a DNS server/appliance). For example, grid members (e.g., DNS servers 1206 and 1208) can be provided for managing on-premise servers in private network 1202.

As also shown in FIG. 12, a public cloud network 1210 (e.g., an on AWS public cloud network) includes a Grid Master Candidate (GMC) 1212 in VPC 1214 (e.g., in private) that is in communication with GM 1204 as shown. Public cloud network 1210 also includes a grid member in each of the different VPCs (e.g., grid member 1216 in VPC 1214 and grid member 1220 in VPC 1218).

Deployment Scenario 5

Figure 13:
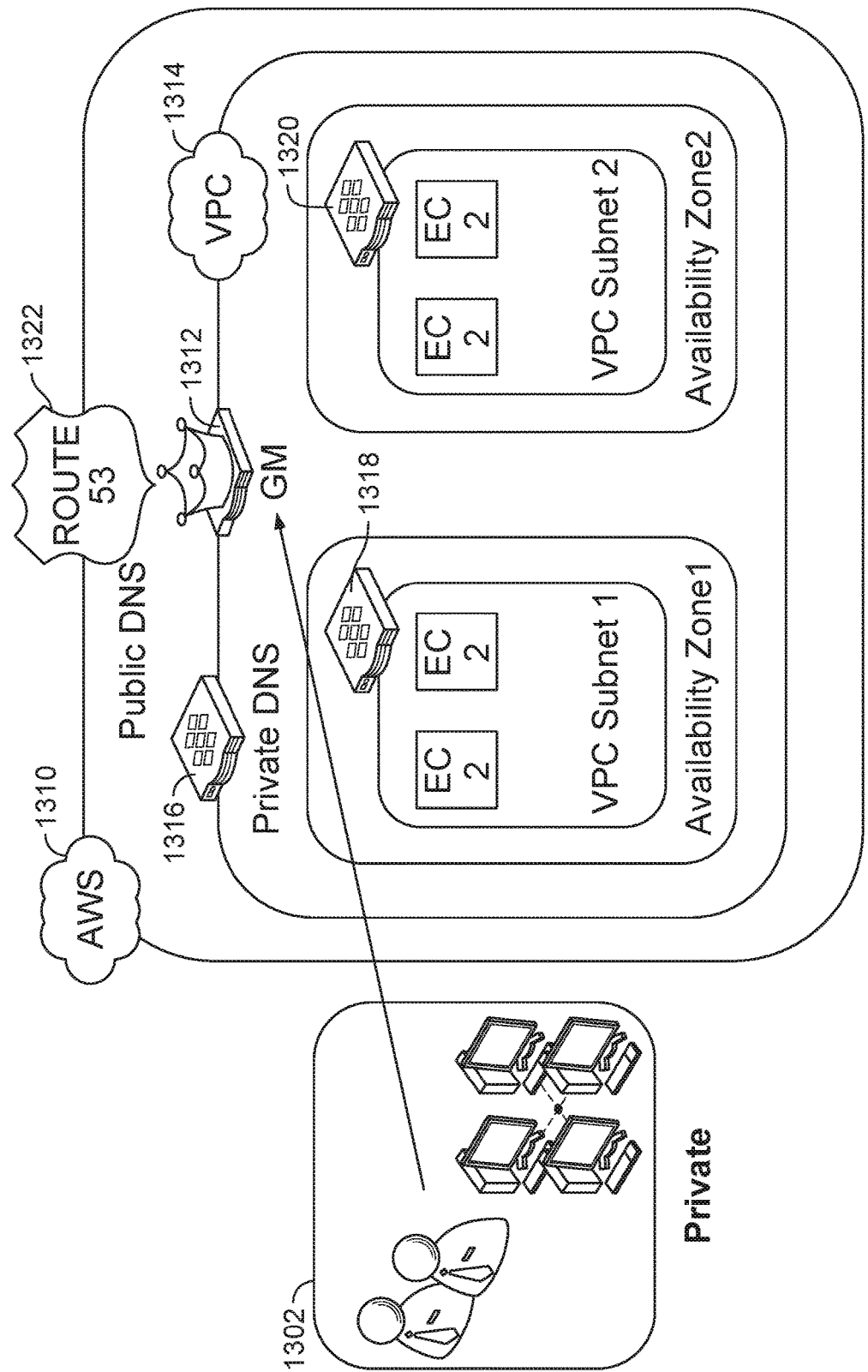
FIG. 13 is a network diagram illustrating another example deployment scenario for integration with a public cloud service using an API gateway for network policy and configuration management with public cloud in accordance with some embodiments.

FIG. 13 is a network diagram illustrating another example deployment scenario for integration with a public cloud service using an API gateway for network policy and configuration management with public cloud in accordance with some embodiments. Specifically, a fifth example deployment scenario for integration with a public cloud service is shown in FIG. 13.

Referring to FIG. 13, a private network 1302 (e.g., an on-premise enterprise network) is shown. In this example deployment scenario, there is no grid master in private network 1302. Also, there are no workloads executing in private network 1302.

As also shown in FIG. 13, a public cloud network 1310 (e.g., an on AWS public cloud network) includes a Grid Master (GM) 1312 in VPC 1314 (e.g., in private). Public cloud network 1310 also includes a grid member in each of the different AZs (e.g., grid member 1318 in AZ 1 and grid member 1320 in AZ 2) as shown. A public DNS service is provided in public cloud network 1310 using Route 53 as shown at 1322 and a private DNS server 1316 is also included in public cloud network 1310.

In this example deployment scenario, a complete grid with a grid master (e.g., GM 1312) and grid members is deployed in public cloud network 1310. Also, in this example, all of the workloads are executed in public cloud network 1310. As also shown, each of the grid members are deployed in different AZs.

For example, a key deployment consideration for the API gateway function is guaranteeing local survivability of cloud workloads. A Cloud Platform Member (CPM) is able to receive delegated authority from the Grid Master (GM) for certain objects that are needed by cloud workloads. Therefore, as long as the workloads have network access to the CPM, they can continue to function even if the GM is not reachable. In AWS, this means that an example of a best practice is to deploy at least one CPM in each AWS region (e.g., as shown in FIG. 13). There may also be cases where it makes sense to deploy a CPM dedicated to key applications, such as where the application is described by a template configuration that is repeated in various locations. Another example key consideration is to keep delineations of delegated authority unambiguous. For instance, it may not make sense to have two API gateways in a region without a scheme for how to divide the authority for objects in that region.

Deployment Scenario 6

Figure 14:
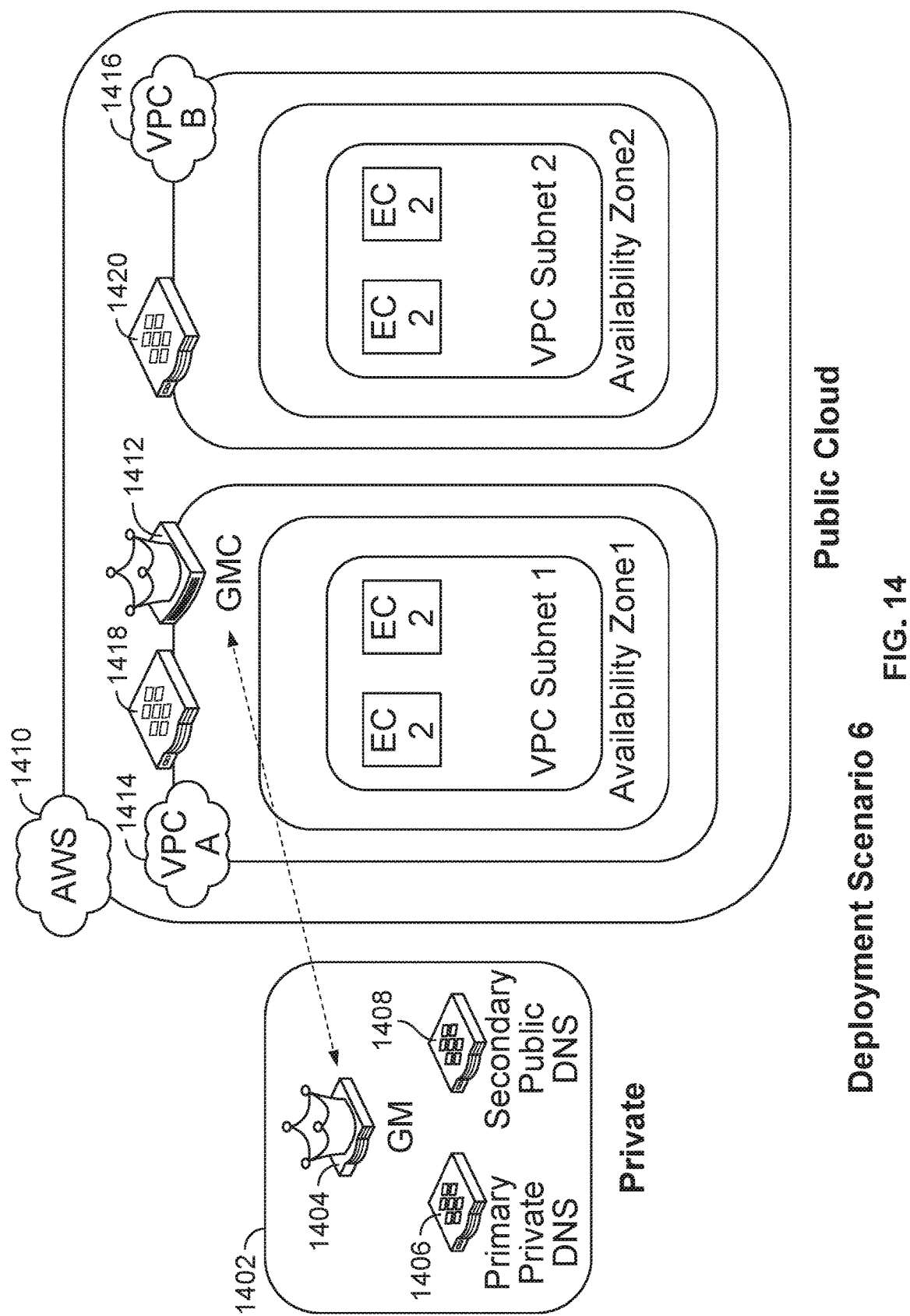
FIG. 14 is a network diagram illustrating another example deployment scenario for integration with a public cloud service using an API gateway for network policy and configuration management with public cloud in accordance with some embodiments.

FIG. 14 is a network diagram illustrating another example deployment scenario for integration with a public cloud service using an API gateway for network policy and configuration management with public cloud in accordance with some embodiments. Specifically, a sixth example deployment scenario for integration with a public cloud service is shown in FIG. 14.

Referring to FIG. 14, a private network 1402 (e.g., an on-premise enterprise network) includes a Grid Master (GM) 1404, a primary private DNS server 1406 (e.g., a DNS server/appliance), and a secondary public DNS server 1408 (e.g., a DNS server/appliance). For example, grid members (e.g., DNS servers 1406 and 1408) can be provided for managing on-premise servers in private network 1402.

As also shown in FIG. 14, a public cloud network 1410 (e.g., an on AWS public cloud network) includes a Grid Master Candidate (GMC) 1412 in VPC A 1414 (e.g., in private) that is in communication with GM 1404 as shown. Public cloud network 1410 also includes a grid member in each of the different VPCs (e.g., grid member 1418 in VPC A 1414 and grid member 1420 in VPC B 1416) as shown.

In this example deployment scenario, the GM and grid members are provided in private network 1402. Also, the GMC provides redundancy to the GM in the cloud, and grid members are provided in each of the different VPCs of public cloud network 1410.

Deployment Scenario 7

Figure 15:
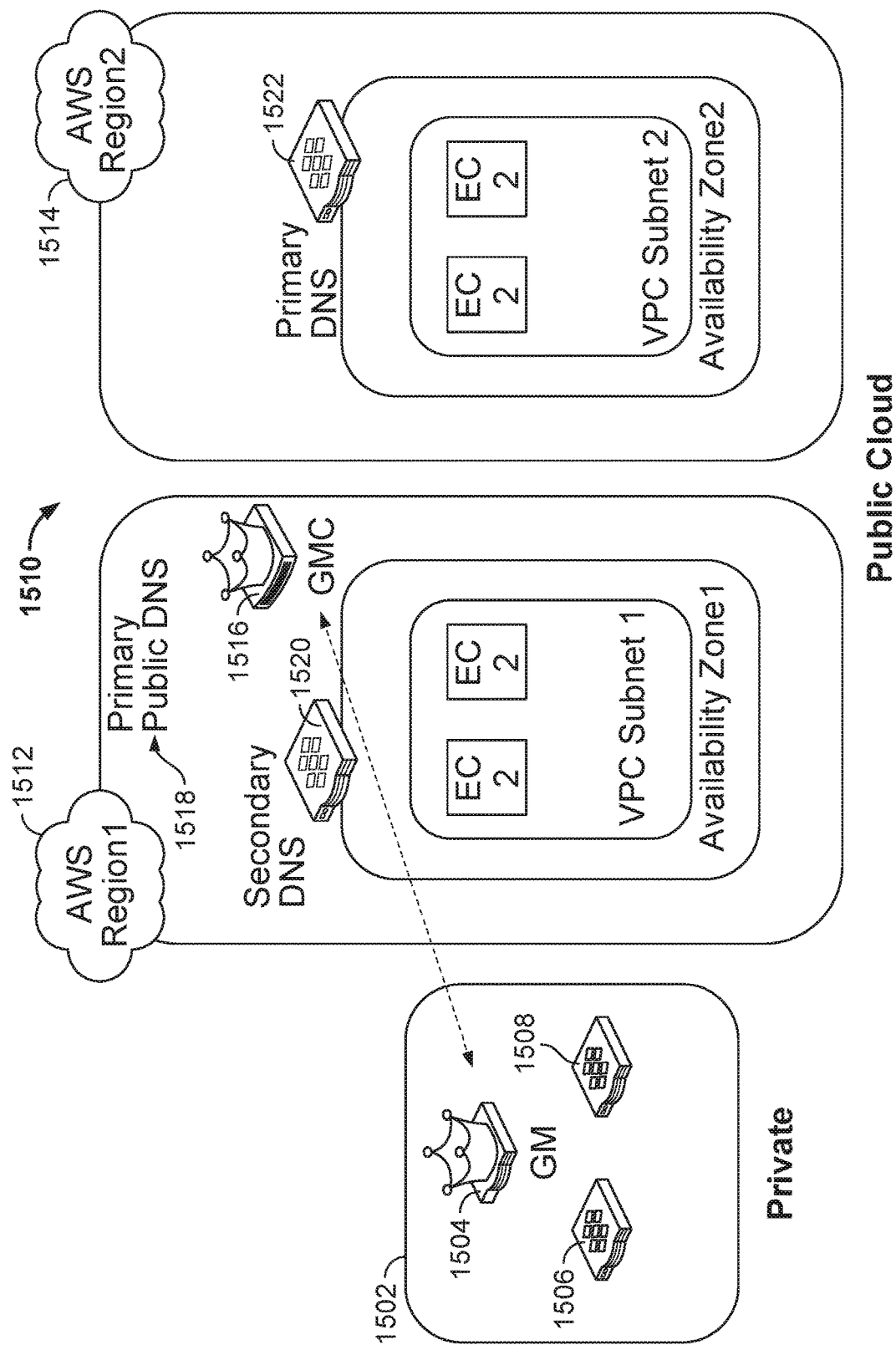
FIG. 15 is a network diagram illustrating another example deployment scenario for integration with a public cloud service using an API gateway for network policy and configuration management with public cloud in accordance with some embodiments.

FIG. 15 is a network diagram illustrating another example deployment scenario for integration with a public cloud service using an API gateway for network policy and configuration management with public cloud in accordance with some embodiments. Specifically, a seventh example deployment scenario for integration with a public cloud service is shown in FIG. 15.

Referring to FIG. 15, a private network 1502 (e.g., an on-premise enterprise network) includes a Grid Master (GM) 1504 and grid members 1506 and 1508. For example, grid members (e.g., DNS/IPAM servers/appliances) can be provided for managing on-premise servers in private network 1502.

As also shown in FIG. 15, a public cloud network 1510 (e.g., an on AWS public cloud network) includes an AWS Region 1 shown at 1512 and an AWS Region 2 shown at 1514. AWS Region 1 (1512) includes a Grid Master Candidate (GMC) 1516 (e.g., the GMC is in the public cloud and provides a failover redundancy for the GM on-premises, that is, as similarly described in these example deployment scenarios, the GMC can be provided at a separate location from the GM, and the cloud can provide a convenient and reliable separate computing facility for the GMC) that is in communication with GM 1504 as shown. AWS Region 1 (1512) also includes a primary public DNS 1518 and a secondary DNS 1520. AWS Region 2 (1514) includes a primary DNS 1522.

In this example deployment scenario, the GM and grid members are provided in private network 1502. Also, the GMC is provided in private, and grid members are provided in each of the different regions (e.g., AWS Region 1 (1512) and AWS Region 2 (1514)) of public cloud network 1510.

As will now be apparent, these and various other deployment scenarios can be provided to similarly facilitate integration with a public cloud service using an API gateway for network policy and configuration management with public cloud using the disclosed techniques.

Example Processes for an API Gateway for Network Policy and Configuration Management with Public Cloud Example processes for performing the disclosed techniques for an API gateway for network policy and configuration management with public cloud will now be described.

Figure 16:
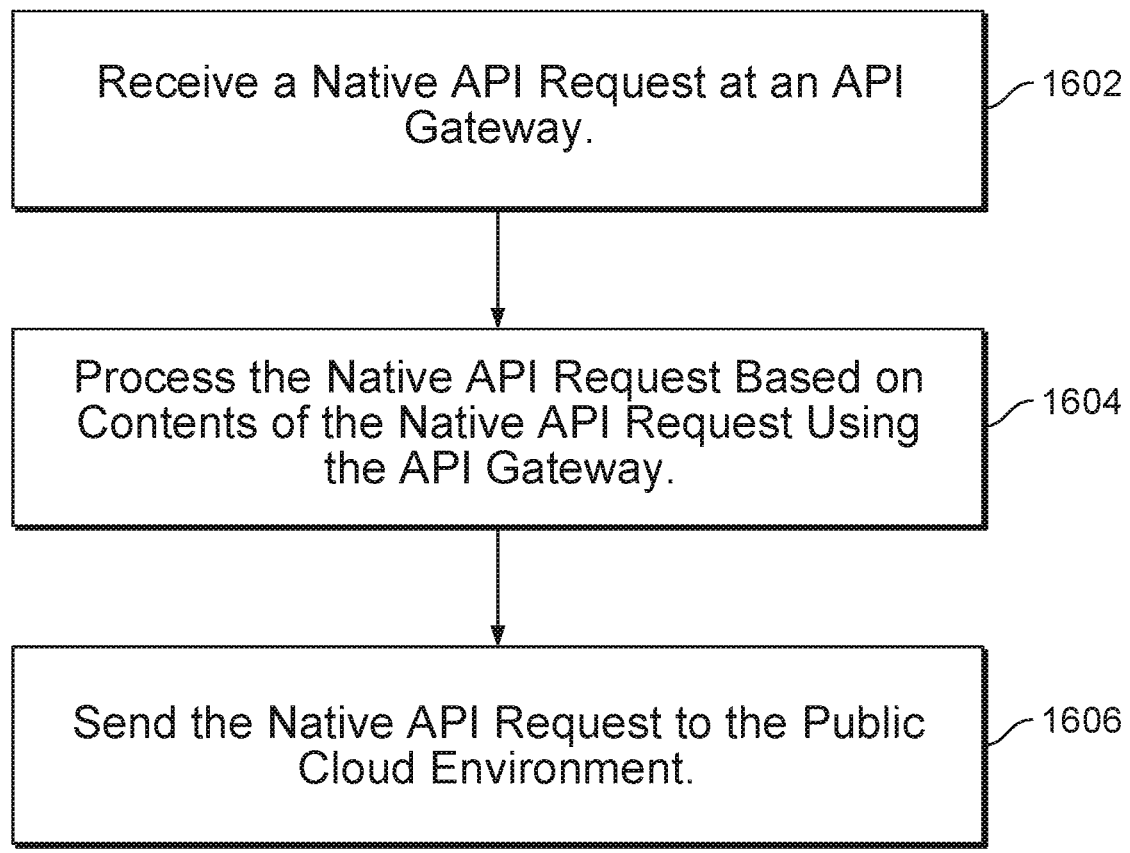
FIG. 16 is a flow diagram illustrating a process for an API gateway for network policy and configuration management with public cloud in accordance with some embodiments.

FIG. 16 is a flow diagram illustrating a process for an API gateway for network policy and configuration management with public cloud in accordance with some embodiments. In one embodiment, the process is performed by an API gateway, such as the activity/functionality and API gateway described above.

Referring to FIG. 16, at 1602, a native application programming interface (API) request (e.g., a standard API request) is received at an API gateway.

At 1604, processing using the API gateway based on contents of the native API request is performed. For example, the processing based on contents of the native API request can trigger actions to be performed on other systems, such as similarly described above.

At 1606, the native API request (e.g., unmodified native API request) is sent to the public cloud environment.

For example, the API gateway can intercept a native API request (e.g., run instance/create instance) and based on information in the native API request (e.g., subnet ID), determine the CIDR associated with the request based on metadata/configurations stored in a DDI system (e.g. subnet ID x maps to CIDR 10.10.10.0/24, allocate next available IP for the CIDR, and modify the API call to give the instance the private IP assigned by Infoblox).

In one embodiment, the processing of the native API request includes inserting data in a modified version of the native API request based on processing using the API gateway based on contents of the native API request; and sending the modified version of the native API request to the public cloud environment.

Figure 17:
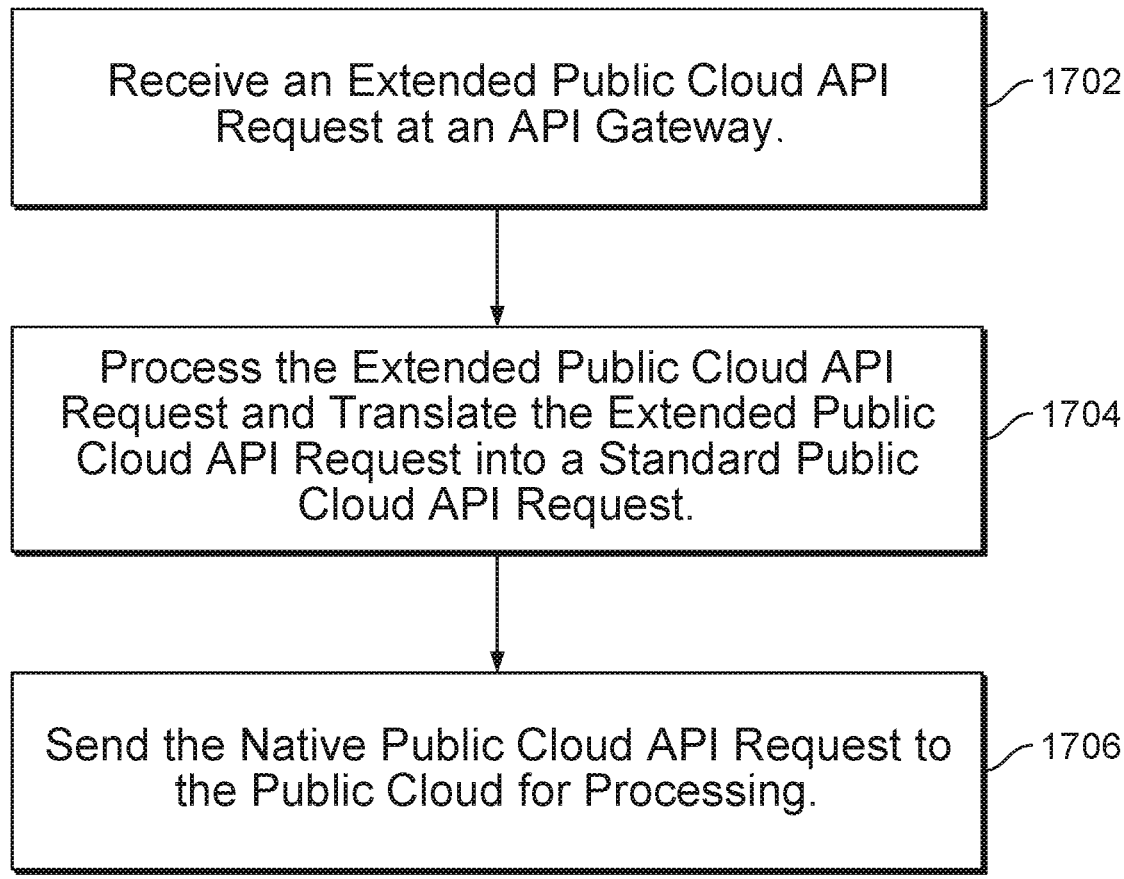
FIG. 17 is another flow diagram illustrating a process for an API gateway for network policy and configuration management with public cloud in accordance with some embodiments.

FIG. 17 is another flow diagram illustrating a process for an API gateway for network policy and configuration management with public cloud in accordance with some embodiments. In one embodiment, the process is performed by an API gateway, such as the activity/functionality and API gateway described above.

Referring to FIG. 17, at 1702, an extended public cloud API request (e.g., an enhanced public cloud API request, such as a public cloud API request with an extension) is received at an API gateway. For example, the extended public cloud API request is related to a resource in a public cloud environment (e.g., AWS, Microsoft Azure, Google Cloud Platform, and/or other public cloud environments) and can be received from an API client (e.g., a global cloud manager). The API gateway can be implemented on a server/appliance (e.g., a Grid Manager, a grid member, a cloud platform member, or another DDI server/appliance, or as a standalone gateway server/appliance, which can also be implemented as a virtual device in a private cloud or the public cloud environment or another public cloud environment). In this example, the resource can be a virtual or physical resource. In an example implementation, the server/appliance can be implemented as a virtual or physical IP address and/or DNS record management appliance/server that is a member of a grid that includes a plurality of grid members (e.g., cloud platform members) and a grid master.

At 1704, processing the extended public cloud API request and translating the extended public cloud API request into a native public cloud API request is performed. For example, the processing of the extended public cloud API request can include analyzing contents of the extended public cloud API request and triggering actions to be performed (e.g., on other systems), such as similarly described above. As an example of such a triggered action, the API gateway can determine a specified IP address to allocate to a request for a new instance based on an Extended Attribute (EA) included as a parameter of the extended public cloud API request, and the API gateway can then translate the extended public cloud API request in a form that is a native public cloud API request for the public cloud environment and which includes the translated API request with the specified IP address for the requested new instance. These and various other example extensions/enhancements for such native public cloud API requests for providing for network policy and configuration management for an enhanced integration with DDI services are disclosed herein (e.g., various other extensions, special parameters, and actions/workflow processing are described herein).

At 1706, the native public cloud API request is sent to the public cloud for processing. For example, if the request is for a new instance to be created in the public cloud environment with a specified IP address, then the public cloud can process the native public cloud API request that includes the specified IP address to instantiate the requested new virtual instance with the specified IP address. The public cloud can also send a response confirming that the requested new virtual instance with the specified IP address has been created in the public cloud environment, which the API gateway can receive and return to the API client.

In one embodiment, as a result of the processing of the extended public cloud API request, a storage of infrastructure metadata information for IP address and DNS record management (e.g., for the grid) is updated based on the extended public cloud API request and response confirming the processing of the translated/rewritten public cloud API request received from the public cloud environment (e.g., if processed by one of the cloud platform appliances, then any such updates based on the processed cloud request can also be synchronized to the grid master, and the grid, as similarly described above). For example, the infrastructure metadata information can include one or more of the following: a fully qualified domain name (FQDN), an Internet Protocol (IP) address, a Media Access Control (MAC) address, an operating system (OS) metadata, a virtual data center metadata, an infrastructure manager metadata, a hypervisor metadata, a virtual entity metadata, a virtual cluster metadata, a virtual host metadata, a host server metadata, a virtual switch metadata, a virtual entity type metadata, an extensible attribute, a virtual resource container metadata, an organization metadata, a cloud metadata, a data center metadata, and an external network metadata.

Figure 18:
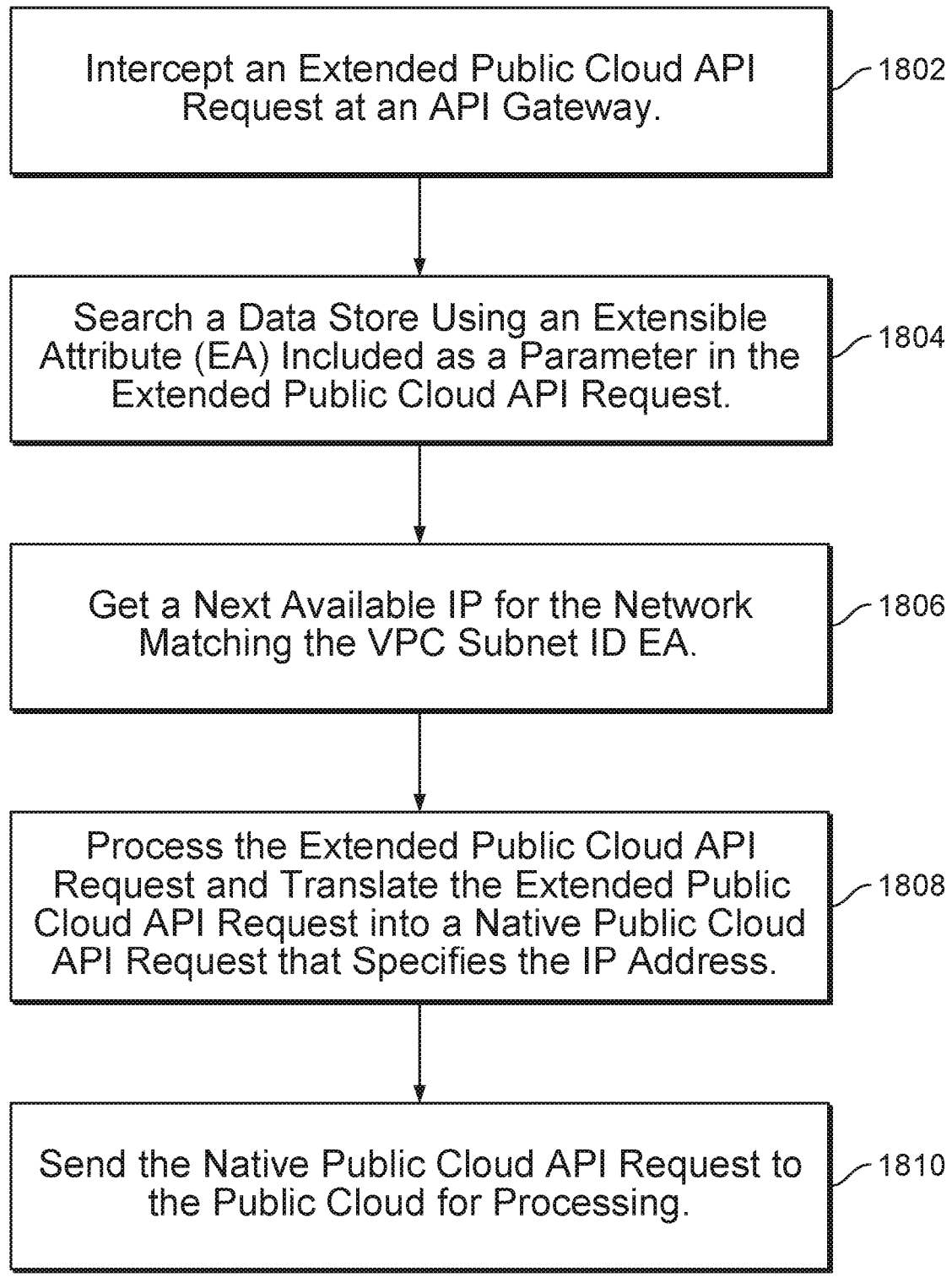
FIG. 18 is another flow diagram illustrating a process for an API gateway for network policy and configuration management with public cloud in accordance with some embodiments.

FIG. 18 is another flow diagram illustrating a process for an API gateway for network policy and configuration management with public cloud in accordance with some embodiments. In one embodiment, the process is performed by an API gateway, such as the activity/functionality and API gateway described above.

Referring to FIG. 18, at 1802, an extended public cloud API request is intercepted at an API gateway. For example, an API client can be configured to direct the extended public cloud API request to the API gateway for processing, such as similarly described above.

At 1804, a data store is searched using an extensible attribute (EA) included as a parameter in the extended public cloud API request. For example, the extended public cloud API request can include an EA as a parameter included in the extended public cloud API request. The API gateway can be configured to search a local data store (e.g., a local NIOS database) using, for example, an EA VPC subnet ID for the network that matches the specified EA.

At 1806, a next available IP address for the network matching the VPC subnet ID EA is obtained.

At 1808, processing the extended public cloud API request is performed to translate the extended public cloud API request into a native public cloud API request that specifies the IP address (e.g., from NIOS in the PrivateIpAddress parameter).

At 1810, the native public cloud API request is sent to the public cloud (e.g., public cloud environment) for processing.

Figure 19:
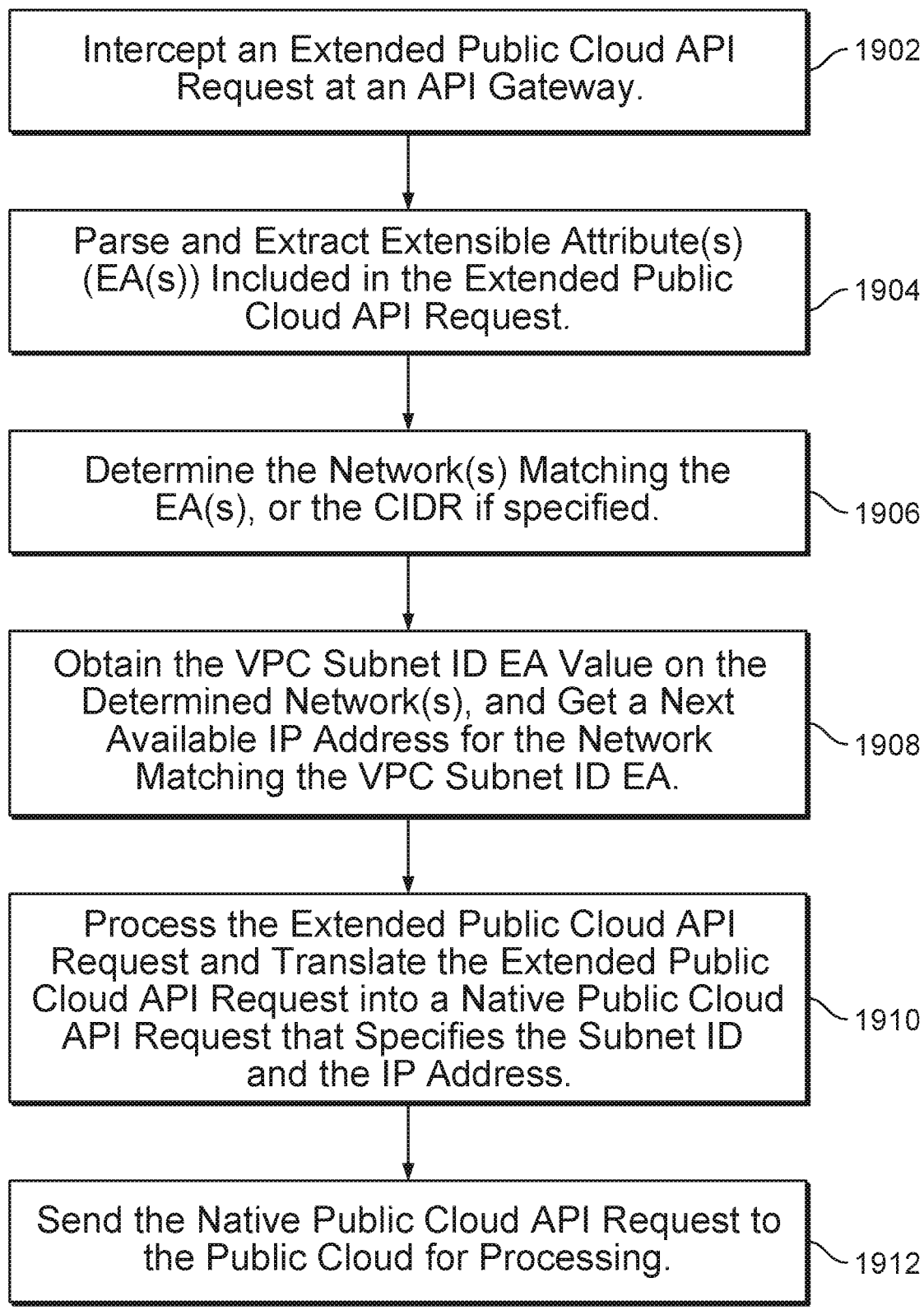
FIG. 19 is another flow diagram illustrating a process for an API gateway for network policy and configuration management with public cloud in accordance with some embodiments.

FIG. 19 is another flow diagram illustrating a process for an API gateway for network policy and configuration management with public cloud in accordance with some embodiments. In one embodiment, the process is performed by an API gateway, such as the activity/functionality and API gateway described above. In another example implementation, an extension to the API with EA/value pairs or the specific CIDR is provided, and the workflow for the API gateway is described below.

Referring to FIG. 19, at 1902, an extended public cloud API request is intercepted at an API gateway. For example, an API client can be configured to direct the extended public cloud API request to the API gateway for processing, such as similarly described above.

At 1904, Extensible Attribute(s) (EA(s)) included in the extended public cloud API request are parsed and extracted.

At 1906, the network(s) that match the EAs are determined, or if an actual CIDR is specified, than that CIDR is utilized.

At 1908, the VPC subnet ID EA value on the determined network(s) is obtained (e.g., returned from NIOS), and a next available IP address on the first matched network is obtained (e.g., if that get IP address operation fails, attempt to get a next available IP address, and so on).

At 1910, processing the extended public cloud API request is performed to translate the extended public cloud API request into a native public cloud API request that specifies the subnet ID and the IP address (e.g., from NIOS in the PrivateIpAddress parameter).

At 1912, the native public cloud API request is sent to the public cloud (e.g., public cloud environment) for processing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor of an application programming interface (API) gateway for network policy and configuration management with a public cloud environment, wherein the processor is configured to:
   intercept an extended public cloud API request at the API gateway;
   search a data store using an extensible attribute (EA) as a parameter in the extended public cloud API request;
   obtain a next available Internet protocol (IP) address for a network matching a virtual private cloud (VPC) subnet identifier (ID) EA;
   process the extended public cloud API request and translate the extended public cloud API request into a native public cloud API request that specifies the IP address; and
   send the native public cloud API request to the public cloud environment for processing; and
   a memory coupled to the processor and configured to provide the processor with instructions.

2. The system recited in claim 1, wherein the API gateway inspects, processes, and modifies the extended public cloud API request to generate the native public cloud API request.

3. The system recited in claim 1, wherein the API gateway is implemented on an appliance.

4. The system recited in claim 1, wherein the API gateway is implemented on an appliance, and wherein the appliance includes an IP address appliance and/or a Domain Name System (DNS) record management appliance.

5. The system recited in claim 1, wherein the API gateway is implemented on a cloud platform appliance, and wherein the cloud platform appliance includes a virtual IP address appliance and/or a Domain Name System (DNS) record management appliance.

6. The system recited in claim 1, wherein the API gateway is implemented on a cloud platform appliance, and wherein the cloud platform appliance is configured as a primary cloud platform appliance for receiving cloud requests from a global cloud manager.

7. The system recited in claim 1, wherein the public cloud API request is related to a resource in the public cloud environment, and wherein the resource in the public cloud environment is associated with a virtual resource.

8. The system recited in claim 1, wherein the public cloud API request is related to a resource in the public cloud environment, and wherein the resource in the public cloud environment is associated with a physical resource.

9. The system recited in claim 1, wherein the public cloud API request includes metadata that is not supported by the native API(s) for the public cloud environment.

10. The system recited in claim 1, wherein the public cloud API request indicates whether a resource is a newly added resource in the public cloud environment, a deleted resource in the public cloud environment, or a modified resource in the public cloud environment.

11. The system recited in claim 1, wherein the processor is further configured to:
    parse and extract the EA included in the extended public cloud API request.

12. The system recited in claim 1, wherein the processor is further configured to:
    parse and extract the EA included in the extended public cloud API request; and
    determine the network matching the VPC subnet ID EA or a Classless Inter-Domain Routing (CIDR) block.

13. The system recited in claim 1, wherein the processor is further configured to:
    communicate with a grid master or a cloud member that is authoritative for an object associated with the public cloud API request.

14. A method, comprising:
    intercepting an extended public cloud API request at an API gateway for network policy and configuration management with a public cloud environment;
    searching a data store using an extensible attribute (EA) as a parameter in the extended public cloud API request;
    obtaining a next available Internet protocol (IP) address for a network matching a virtual private cloud (VPC) subnet identifier (ID) EA;
    processing the extended public cloud API request and translating the extended public cloud API request into a native public cloud API request that specifies the IP address; and
    sending the native public cloud API request to the public cloud environment for processing.

15. The method of claim 14, further comprising:
    parsing and extracting the EA included in the extended public cloud API request.

16. The method of claim 14, further comprising:
    parsing and extracting the EA included in the extended public cloud API request; and
    determining the network matching the VPC subnet ID EA or a Classless Inter-Domain Routing (CIDR) block.

17. The method of claim 14, further comprising:
    communicating with a grid master or a cloud member that is authoritative for an object associated with the public cloud API request.

18. The method of claim 14, wherein the API gateway inspects, processes, and modifies the extended public cloud API request to generate the native public cloud API request.

19. The method of claim 14, wherein the API gateway is implemented on an appliance, and wherein the appliance includes an IP address appliance and/or a Domain Name System (DNS) record management appliance.

20. The method of claim 14, wherein the API gateway is implemented on a cloud platform appliance, and wherein the cloud platform appliance includes a virtual IP address appliance and/or a Domain Name System (DNS) record management appliance.

21. The method of claim 14, wherein the API gateway is implemented on a cloud platform appliance, and wherein the cloud platform appliance is configured as a primary cloud platform appliance for receiving cloud requests from a global cloud manager.

22. The method of claim 14, wherein the public cloud API request is related to a resource in the public cloud environment, and wherein the resource in the public cloud environment is associated with a virtual resource.

23. The method of claim 14, wherein the public cloud API request is related to a resource in the public cloud environment, and wherein the resource in the public cloud environment is associated with a physical resource.

24. The method of claim 14, wherein the public cloud API request includes metadata that is not supported by the native API(s) for the public cloud environment.

25. The method of claim 14, wherein the public cloud API request indicates whether a resource is a newly added resource in the public cloud environment, a deleted resource in the public cloud environment, or a modified resource in the public cloud environment.

26. A computer program product, the computer program product being embodied in a tangible non-transitory computer readable storage medium and comprising computer instructions for:
   intercepting an extended public cloud API request at an API gateway for network policy and configuration management with a public cloud environment;
   searching a data store using an extensible attribute (EA) as a parameter in the extended public cloud API request;
   obtaining a next available Internet protocol (IP) address for a network matching a virtual private cloud (VPC) subnet identifier (ID) EA;
   processing the extended public cloud API request and translating the extended public cloud API request into a native public cloud API request that specifies the IP address; and
   sending the native public cloud API request to the public cloud environment for processing.

27. The computer program product recited in claim 26, further comprising computer instructions for:
   parsing and extracting the EA included in the extended public cloud API request.

28. The computer program product recited in claim 26, further comprising computer instructions for:
   parsing and extracting the EA included in the extended public cloud API request; and
   determining the network matching the VPC subnet ID EA or a Classless Inter-Domain Routing (CIDR) block.

29. The computer program product recited in claim 26, further comprising computer instructions for:
   communicating with a grid master or a cloud member that is authoritative for an object associated with the public cloud API request.

30. The computer program product recited in claim 26, wherein the API gateway inspects, processes, and modifies the extended public cloud API request to generate the native public cloud API request.

31. The computer program product recited in claim 26, wherein the API gateway is implemented on an appliance, and wherein the appliance includes an IP address appliance and/or a Domain Name System (DNS) record management appliance.

32. The computer program product recited in claim 26, wherein the API gateway is implemented on a cloud platform appliance, and wherein the cloud platform appliance includes a virtual IP address appliance and/or a Domain Name System (DNS) record management appliance.

33. The computer program product recited in claim 26, wherein the API gateway is implemented on a cloud platform appliance, and wherein the cloud platform appliance is configured as a primary cloud platform appliance for receiving cloud requests from a global cloud manager.

34. The computer program product recited in claim 26, wherein the public cloud API request is related to a resource in the public cloud environment, and wherein the resource in the public cloud environment is associated with a virtual resource.

35. The computer program product recited in claim 26, wherein the public cloud API request is related to a resource in the public cloud environment, and wherein the resource in the public cloud environment is associated with a physical resource.

36. The computer program product recited in claim 26, wherein the public cloud API request includes metadata that is not supported by the native API(s) for the public cloud environment.

37. The computer program product recited in claim 26, wherein the public cloud API request indicates whether a resource is a newly added resource in the public cloud environment, a deleted resource in the public cloud environment, or a modified resource in the public cloud environment.

* * * * *

UNITED STATES PATENT AND TRADEMARK OFFICE
CERTIFICATE OF CORRECTION

PATENT NO.         : 10,469,314 B2
APPLICATION NO.    : 16/162915
DATED              : November 5, 2019
INVENTOR(S)        : James D. Ennis, Jr., Mehul Jayantilal Bhatt and John Charles Voss It is certified that error appears in the above-identified patent and that said Letters Patent is hereby corrected as shown below:

In the Specification

In Column 12, Line 53, delete "314 For" and insert --314. For--, therefor.

Signed and Sealed this
Twenty-fifth Day of August, 2020

Andrei Iancu
*Director of the United States Patent and Trademark Office*